US006370681B1

(12) United States Patent
Dellarocas et al.

(10) Patent No.: US 6,370,681 B1
(45) Date of Patent: Apr. 9, 2002

(54) COMPUTER SYSTEM AND COMPUTER IMPLEMENTED PROCESS FOR REPRESENTING SOFTWARE SYSTEM DESCRIPTIONS AND FOR GENERATING EXECUTABLE COMPUTER PROGRAMS AND COMPUTER SYSTEM CONFIGURATIONS FROM SOFTWARE SYSTEM DESCRIPTIONS

(75) Inventors: Chrysanthos Nicholas Dellarocas, Boston; Thomas W. Malone, Weston, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 08/958,142

(22) Filed: Oct. 28, 1997

Related U.S. Application Data

(63) Continuation of application No. 08/820,913, filed on Mar. 19, 1997, now abandoned.
(60) Provisional application No. 60/013,694, filed on Mar. 19, 1996.

(51) Int. Cl.$^7$ .................................................. G06F 9/45
(52) U.S. Cl. ........................................................ 717/1
(58) Field of Search ................................ 395/701, 702; 717/1, 2, 11; 345/967

(56) References Cited

U.S. PATENT DOCUMENTS

| | | | |
|---|---|---|---|
| 4,736,320 A | 4/1988 | Bristol | |
| 4,809,170 A | 2/1989 | Leblanc | |
| 4,905,163 A | 2/1990 | Garber | |
| 4,974,160 A | 11/1990 | Bone | |
| 5,195,178 A | 3/1993 | Krieger | |

(List continued on next page.)

OTHER PUBLICATIONS

Baligh, H.H., Burton, R.M. and Obel, B. (1990) Devising expert systems in organization theory: The Organizational Consultant. In M. Masuch (Ed.), *Organization, Management, and Expert Systems* (pp. 35–57). Berlin: Walter de Gruyter.

(List continued on next page.)

Primary Examiner—Kakali Chaki
Assistant Examiner—Wei Zhen
(74) Attorney, Agent, or Firm—Wolf, Greenfield & Sacks, P.C.

(57) ABSTRACT

A computer software system includes interdependent collections of software components. That is, at the architectural level, software components and their interdependencies are two distinct equally important entities. The software components represent the core functional pieces of an application and deal with concepts specific to an application domain. Interdependencies relate to concepts orthogonal to the problem domain in most applications, such as transportation, sharing of resources and synchronization constraints among components. An architectural description language which represents activities and dependencies between activities as separate entities. Dependencies are managed by coordination processes associated with the dependency. Activities and dependencies are connected through ports which encode interfaces between activities and coordination processes. The language may also represent resources which may be understood as the output of some activity beyond the scope of the system. Each entity, i.e., activity, dependency, port or resource, may also have attributes which are name value pairs, specifying additional information about the entity. Attributes may be inherited. That is, activities and dependencies may be specialized into particular versions of an activity or dependency. The attributes for a particular activity are inherited by its specializations. An editor repository and design assistant may be based on this language to provide a system that automatically generates executable code.

22 Claims, 20 Drawing Sheets

U.S. PATENT DOCUMENTS

| | | | |
|---|---|---|---|
| 5,206,950 A | | 4/1993 | Geary |
| 5,212,771 A | | 5/1993 | Gane |
| 5,233,513 A | | 8/1993 | Doyle |
| 5,237,691 A | | 8/1993 | Robinson |
| 5,249,300 A | | 9/1993 | Bachman |
| 5,261,100 A | | 11/1993 | Fujinami |
| 5,287,515 A | | 2/1994 | Murai |
| 5,361,360 A | | 11/1994 | Ishigami |
| 5,367,473 A | * | 11/1994 | Chu et al. ................... 702/186 |
| 5,471,636 A | | 11/1995 | Hauck |
| 5,487,131 A | | 1/1996 | Kassatly |
| 5,493,682 A | * | 2/1996 | Tyra et al. .................. 395/703 |
| 5,519,867 A | | 5/1996 | Moeller |
| 5,524,246 A | | 6/1996 | Hurley |
| 5,535,388 A | | 7/1996 | Takeda |
| 5,542,070 A | | 7/1996 | Leblanc |
| 5,544,308 A | | 8/1996 | Giordano |
| 5,583,983 A | | 12/1996 | Schmitter |
| 5,587,935 A | | 12/1996 | Brooks |
| 5,651,111 A | * | 7/1997 | McKeeman et al. .......... 714/38 |
| 5,699,310 A | | 12/1997 | Garloff et al. |
| 5,802,314 A | * | 9/1998 | Tullis et al. ................ 709/246 |
| 5,854,929 A | * | 12/1998 | Van Praet et al. .......... 395/705 |

OTHER PUBLICATIONS

Chandrasekaran, B. (1983). Towards a taxonomy of problem solving types. *AI Magazine,* 4(1), 9–17.

Clancey, W.J. (1983). The epistemology of a rule–based expert system—A framework for explanation. *Artificial Inteligence,* 20(3), 215–251.

Lee, J. (1990). Sibyl: A tool for managing group decision rationale. In *ACM Conference on Computer–Supported Cooperative Work* (CSCW '90). Los Angeles, CA.

Malone, T.W., Lai, K.–Y. and Fry, C. (1992). Experiments with Oval: A radically tailorable tool for cooperative work. In *Proceedings of the ACM Conference on Computer–Supported Cooperative Work* (CSCW'92). Toronto, Ontario.

Schank, R.C. (1982). Dynamic Memory: A theory of reminding and learning in computers and people. New York: Cambridge University Press.

Stefix, M. and Bobrow, D.G. (1986). Object–oriented programming: Themes and variations. *AI Magazine,* (Spring), 40–62.

Booch, G., *Object Oriented Design with Applications.* 1991, Redwood City, California: Benjamin/Cummings.

deChampeaux, D. Object–Oriented Analysis and Top–Down Software Development in ECOOP '91, *European Conference on Object–Oriented Programming.* 1991. Geneva, Switzerland: Springer–Verlag.

Krueger, C.W., Software reuse. ACM Computing Surveys, 1992. 24(2): p. 131–183.

Malone, T.W., K. Crowston, J. Lee, and B. Pentland. Tools for Inventing Organizations: Toward a Handbook of Organizational Processes. in *Second IEEE Workshop on Enabling Technologies Infrastructure for Collaboratie Enterprises.* 1993. Morgantown, West Virginia.

Nierstrasz, O. Regular Types for Active Objects. in *Conference on Object–Oriented Programming: Systems, Languages, and Applications.* 1993. Washington, D.C.: Association for Computing Machinery.

Rumbaugh, J., M. Blaha, W. Premerlani, F. Eddy, and W. Lorensen, *Object–Oriented Modeling and Design* 1991, Englewood Cliffs, New Jersey: Prentice Hall.

Wegner, P. and S.B. Zdonik. Inheritance as an Incremental Modification Mechanism or What Like Is and Isn't Like. in *European Conference on Object–Oriented Programming.* 1988. Oslo, Norway: Springer–Verlag.

Bhandaru, N. and Croft, W.B. An architecture for supporting goal–based cooperative work. In *Multi–User Interfaces and Applications,* S. Gibbs and A.A. Verrijin–Stuart (Ed.), Elsevier (North Holland), Amsterdam, 1990, pp. 337–354.

Lai, K.Y., Malone, T.W. & Yu, K.C. Object Lens: A 'spreadsheet' for cooperative work. *ACM Transactions on Office Information Systems,* Oct. 1988, 6, 332–353.

Malone, T.W., Grant, K.R., Lai, K.Y., Rao, R. & Rosenblitt, D.A. Semi–structured messages are surprisingly useful for computer–supported coordination, *ACM Transactions on Office Information Systems,* 1987, 5, 115–131.

Richard M. Alder. Emerging Standards for Component Software. *IEEE Computer,* Mar. 1995, pp. 68–77.

James F. Allen. Towards a General Theory of Action and Time. *Artificial Intelligence* 23 (1984), pp. 123–154.

B.P. Allen and S.D. Lee. A Knowledge–Based Environment for the Development of Software Parts Composition Systems. In *Proceedings, 12th Int'l Conference on Software Engineering,* 1989, pp. 104–112.

R. Allen. Formalizing Software Architecture Style. *ACM SIGSOFT Third Symposium on Foundations of Software Engineering,* Mar. 9, 1995.

J.M. Andreoli, H. Gallaire and R. Pareschi. Rule–Based Object Coordination. In *Proceedings, ECOOP '94 Workshop on Coordination,* 1994.

Brian W. Beach. Connecting Software Components with Declarative Glue. In *Proceedings, 14th Int'l Conference on Software Engineering,* 1992, pp. 120–137.

J.R. Callahan and J.M. Purtilo. A Packaging System For Heterogeneous Execution Environments. *IEEE Transactions on Software Engineering,* vol. 17, No. 6, Jun. 1991, pp. 626–635.

N. Carriero and D. Gelernter. How to Write Parallel Programs: A Guide to the Perplexed. *ACM Computing Surveys.* vol. 21, No. 3, Sep. 1989, pp. 324–357.

C. Dellarocas, J. Lee, T. W. Malone, K. Crowston and B. Pentland. Using a Process Handbook to Design Organizational Processes. In *Proceedings, AAAI Spring Symposium on Computational Organization Design,* Mar. 21–23, 1994, Stanford, CA pp. 50–56.

Frank DeRemer and Hans H. Kron. Programming–in–the–Large Versus Programming–in–the–Small. *IEEE Transactions on Software Engineering,* vol. SE–2, No. 2, Jun. 1976, pp. 80–86.

E. Gamma, R. Helm, R. Johnson, and J. Vlissides. Design Patterns: Abstractions and reuse of object–oriented design. In *Proceedings, ECOOP '93,* Springer–Verlag LNCS 707, Jul. 1993.

David Garlan and Mary Shaw. An Introduction To Software Architecture. Technical Report CMU–CS–94–166, Jan. 1994. Also appears as CMU/SEI–94–TR–21, ESC–TR–84–21.

D. Garlan, R. Allen, and J. Ockerbloom. Exploiting Style in Architectural Design Environments. *Proceedings, ACM SIGSOFT '94 Symposioum on Foundations of Software Engineering,* New Orleans, LA, Dec. 1994.

D. Garlan, R. Allen and J. Ockerbloom. Architectural Mismatch or Why it's hard to build systems out of existing parts. In *Proceedings, 17th International Conference on Software Engineering,* Seattle, WA Apr. 1995.

Phillip B. Gibbons. A stub Generator for Multilangage RPC in Heterogeneous Environments. *IEEE Transactions on Software Engineering*, vol. SE–13, No. 1, Jan. 1987, pp. 77–87.

Joseph A. Goguen. Reusing and Interconnecting Software Components. *IEEE Computer*, Feb. 1986, pp. 16–28.

R. Hayes and R.D. Schlichting. Facilitating Mixed Language Programming in Distributed Systems, *IEEE Transactions on Software Engineering*, vol. 13, No. 12, Dec. 1987, pp. 1254–1264.

T. Capers Jones. Reusability in Programming: A Survey of the State of the Art. *IEEE Transactions on Software Enginnering*, vol. 10, No. 5, Sep. 1984, pp. 488–494.

M.B. Jones, R.F. Rashid and M.R. Thompson, Matchmaker: An Interface Specification Language for Distributed Processing. In *Proceeding, 12th ACM Symposium of Principles of Programming Languages*, 1985, pp. 225–235.

Paul Kogut and Paul Clements. Features of Architecture Representation Languages. Carnegie Mellon University Technical Report CMU/SEI. Number to be assigned. Draft of Dec. 1994.

S.S. Lam and A.U. Shankar. A Theory of Interfaces and Modules I–Composition Theorem. *IEEE Transactions on Software Engineering*, vol. 20, No. 1, Jan. 1994, pp. 55–71.

David Alex Lamb. IDL: Sharing Intermediate Representations. *ACM Transactions on Programming Languages and Systems*, vol. 9, No. 3, Jul. 1987, pp. 297–318.

Thomas G. Lane. A Design Space and Design Rules for User Interface Software Architecture. Technical Report CMU/SEI–90–TR–22, ESD–90–TR–223, Nov. 1990.

T.J. LeBlanc and S.A. Friedberg. HPC: A Model of Structure and Change in Distributed Systems. *IEEE* Transactions on Computers, vol. C–34, No. 12, Dec. 1985, pp. 1114–1129.

L. Liang, S.T. Chanson and G.W. Neufeld. Process Groups and Group Communications: Classifications and Requirements. *IEEE Computer*, Feb. 1990, pp. 56–65.

J. Magee, J. Kramer and M. Sloman. Constructing Distributed Systems in Conic. *IEEE Transactions on Software Engineering*, vol. 15, No. 6, Jun. 1989, pp. 663–675.

Thomas W. Malone and Kevin Crowston. The Interdisciplinary Study of Coordination. *ACM Computing Surveys*, vol. 26, No. 1, Mar. 1994, pp. 87–119.

S. Meyers and S.P. Reiss. Representing Programs in Multiparadigm Software Development Environments. In *Proceedings, 13th Int'l Computer Science and Applications Conf.*, 1989 (COMPSAC–89), pp. 420–427.

M. Muhlhauser, W. Gerteis and L. Heuser, DOCASE: A Methodic Approach to Distributed Programming. *Communications of the ACM*, vol. 36, No. 9, Sep. 1993, pp. 127–138.

Oscar Nierstrasz. Composing Active Objects. In G. Agha, P. Wegner and A. Yonezawa eds., *Research Directions in Concurrent Object–Oriented Programming*, MIT Press, Cambridge, MA, 1994, pp. 151–171.

Robert Louis Nord. *Deriving and Manipulating Module Interfaces* (Ph.D. thesis). Carnegie Mellon University, CMU–CS–92–126, May 1992.

D.L. Parnas. On the Criteria to Be Used in Decomposing Systems Into Modules. *Communications of the ACM*, vol. 15, No. 12, Dec. 1972, pp. 1053–1058.

Dewayne E. Perry, Software Interconnection Models. In *Proceedings, 9th International Conference on Software Engineering*, 1987, pp. 61–69.

Dewayne E. Perry. The Inscape Environment. In *Proceedings, 11th Int'l Conference on Software Engineering*, 1989, pp. 2–12.

Dewayne Perry and Alexander Wolf. Foundations for the Study of Software Architecture. *ACM SIGSOFT Software Engineering Notes*, vol. 17, No. 4, Oct. 1992, pp. 40–52.

James M. Purtilo. The POLYLITH Software Bus. *ACM Transactions on Programming Languages and Systems*, vol. 16, No. 1, Jan. 1994, pp. 151–174.

M.D. Rice and S.B. Seidman. A Formal Model for Module Interconnection Languages. *IEEE Transactions on Software Engineering*, vol. 20, No. 1, Jan. 1994, pp. 88–101.

Mary Shaw. Procedure Calls Are the Assembly Language of Software Interconnection: Connectors Deserve First–Class Status. Carnegie Mellon University, Technical Report CMU–CS–94–107. Jan. 1994.

Mary Shaw and David Garlan. Characteristics of Higher–level Languages for Software Architecture Technical Report CMU–CS–94–210. Also appears as CMU/SEI–94–TR–23, ESC–TR–94–023.

Mary Shaw et al. Abstractions for Software Architecture and Tools to Support Them. Paper in Progress, Carnegie Mellon University. Version of Mar. 8, 1995.

M.P. Stovsky and B.W. Weide. Building Interprocess Communication Models Using STILE. In *Proceedings, 21st Annual Hawaii Int. Conf. on System Sciences*, 1988, vol. 2, pp. 639–647.

S. Sugimoto, T. Sakaguchi and Koichi Tabata. Layered Architecture of Multiple Programming Language System for Multiparadigm Programming. In *Proceedings, 1992 Int'l Conference on Computer Languages*, pp. 190–199.

Walter F. Tichy. Software Development Control Based on Module Interconnection. In *Proceedings, 4th Int'l Conference on Software Engineering*, 1979, pp. 29–41.

J. Wileden, A. Wolf, W. Rosenblatt and P. Tarr. Specification–Level Interoperability. *Communications of the ACM*, vol. 34, No. 5, May 1991, pp. 72–87.

G. Wyner and G. Zlotkin. Resource, Use and Coordination. Presentation given at the MIT Center for Coordination Science, Apr. 28, 1995.

G. Wyner and J. Lee. Applying Specialization to Process Models. In *Proceedings, Conference on Organizational Computing Systems*, Aug. 13–16, 1995, Milpitas, CA, pp. 290–301.

S.S. Yau and M.U. Caglayan. Distributed Software System Design Representation Using Modified Petri Nets. *IEEE Transactions in Software Engineering*, vol. SE–9, No. 6, Nov. 1983, pp. 733–745.

Pamela Zave. A Compositional Approach to Multiparadigm Programming. *IEEE Software*, Sep. 1989, pp. 15–25.

Bobrow, D.G. and Winograd, T., An Overview of KRL, a Knowledge Representation Language, In: Readings in Knowledge Representation, Brachman, R.J. and Levesque, H.J. (Eds.), (1985) Morgan Kaufman, Los Altos, CA, pp. 264–285.

Friedland P.E. and Iwasaki, Y., The Concept and Implementation of Skeletal Plans, (1984), Journal of Automated Reasoning, vol. 1, No. 2, pp. 161–208.

Lefkowitz, L.S. and Croft, W.B., *Interactive Planning for Knowledge–based Task Management*, (1990), University of Massachusetts, pp. 1–47.

Madsen, O.L., Moller–Pedersen, B. and Nygaard, K., *Object–Oriented Programming in the BETA Programming Language*, Addison–Wesley Publishing Company (1993), Table of Contents, pp. ix–xiv, Chapter 6, pp. 85–107.

Malone, T.W., Crowston, K, Lee, J. and Pentland, B., Tools for Inventing Organizations: Toward a Handbook of Organizational Processes, (1993), In Proceedings of the 2nd IEEE Workshop on Enabling Technologies Infrastructure for Collaborative Enterprises, pp. 1–20.

Pentland, B., Osborn, C.S, Wyner, G. and Luconi, F.L., Useful Descriptions of Organizational Processes: Collecting Data For The Process Handbook, MIT, Center for Coordination Science (2/94), Working Paper.

Smith, R.G. and Friedland, P., (1980), *Unit Package User's Guide*, pp. 1–90.

Stefik, M., Planning with Constraints (MOLGEN: Part 1), Artificial Intelligence 16 (1981), pp. 111–140.

Stefik, M., Planning and Meta–Planning (MOLGEN: Part 2), Artificial Intelligence 16 (1981), pp. 141–170.

Tenenberg, J., Planning With Abstraction, Proceedings of AAAI–86, Fifth National Conference on Artificial Intelligence, 1986, pp. 76–80.

Thomsen, K.S., Inheritance on Processes, Exemplified on Distributed Termination Detection, International Journal of Parallel Programming, vol. 16, No. 1, 1987, pp. 17–53.

Yu, E., Modelling Strategic Relationships For Process Reengineering, (1994), Research in Data and Knowledge Base Systems, University of Toronto, pp. 1–124.

Allen, R. and Garlan, D. The Wright Architectural Specification Language, Carnegie Mellon University, School of Computer Science, CMU–CS–96–TBD, Sep. 1996.

Garlan, D., et al., ACME: An Architectural Description Interchange Language, Carnegie Mellon University, School of Computer Science, Jan. 14, 1997.

Seven Lucco and Oliver Sharp, Delivering An Embedding Coordination Language in Proceedings of Superconducting, 1990 pp. 515–524, IEEE Comput. Soc. Press, Los Angeles, CA.

Shmuel Katz, Charles A. Richter and Khe–Sing The, Paris: A System for Reusing Partially Interpreted Schemas, Chapter 10, pp. 257–273. 9th International Conference on Software Engineering, Mar. 30–Apr. 2, 1987.

Joseph Maglitta, "Tool Time," Computerworld Special Quarterly Report, Nov. 21, 1994, pp. 96–105.

Carlson, D.A. et al., "Hyperintelligence: The Next Frontier", Communications of the ACM, New York, US, 33(3) : 311–321 (1990).

David Gelernter and Nicholas Carriero, "Coordination Languages and Their Significance," Communications of the ACM (Feb. 1992), vol. 35, No. 2, pp. 97–107.

Bill Curtis, Marc Kellner and Jim Over, "Process Modeling," Communications of the ACM (Sep. 1992), vol. 35, No. 9, pp. 75–90.

Cornelius H. Sullivan, Jr. and Charles E. Yates, "Reasoning by Analogy—A Tool for Business Planning," Sloan Management Review, (Spring 1988), pp. 55–60.

David Marrques et al., "Easy Programming: Empowering People to Build Their Own Applications," IEEE expert, 1993, pp. 1–38.

Geoffroy Dallemagne et al., "Making Application Programming More Worthwhile," pp. 1–18 in F. Schmalhofer and G. Strube (ed.), Contemporary Knowledge and Cognition, Heidelberg: Springer Verlag 1991.

Josh Tenenberg, "Planning with Abstraction," In Proceeding of AAAI–86, Philadelphia, PA, 1986.

B. Chandrasekaran, Todd R. Johnson and Jack W. Smith, "Task–Structure Analysis for Knowledge Modeling," Communications of the ACM, vol. 35, No. 9 (Sep. 1992), pp. 124–136.

Roger C. Schank, "Language and Memory," Cognitive Science, vol. 4 (1980), pp. 243–284.

Thomas H. Davenport and James E. Short, "The New Industrial Engineering: Information Technology and Business Process Redesign," Sloan Management Review Reprint Series, Summer 1990, vol. 31, No. 4, pp. 11–27.

Michael Hammer, "Reengineering Work: Don't Automate, Obliterate", Harvard Business Review No. 90406, (Jul.–Aug. 1990), pp. 104–112.

Crowston, K., Towards a Coordination Cookbook: Recipes for Multi–Agent Action, Ph.D. Thesis, Mass. Inst. Tech., Feb. 1991.

Robert Allen and David Garlan, "Formalizing Architectural Connection," 16th International Conference on Software Engineering, Sorrento, Italy, May, 1994, pp. 1–11.

\* cited by examiner

*PH_Object - 110*

| Unique Id | 112 |
|---|---|
| Name | 114 |
| Kind | 116 |
| Creator, etc. | 118 |

FIG. 10

*Parents -120*

| Object Id | 122 |
|---|---|
| Parent Id | 124 |

FIG. 11

*Decomposition - 130*

| Owner Id | 132 |
|---|---|
| Slot Id | 134 |
| Slot Value | 136 |
| Kind | 138 |
| Additional info... | 140 |

FIG. 12

*Connectors - 142*

| Connector Id | 144 |
|---|---|
| Owner Id | 146 |
| Endpoint 1 | 148 |
| Endpoint 2 | 150 |

FIG. 13

240 — COMPONENT "SELECT FILES" ISA PROCEDURE
242 — PROVIDES: PROC SELECT_FILES( );
244 — EXPECTS: PROC VIEW_SELECTED_FILES
246 — (IN CODENUM:INTEGER);
248 — SOURCE FILES: \VIEWER\SELECT.C
250 — ATTRIBUTES: LANGUAGE = C
END COMPONENT

252 — COMPONENT "OPEN DB" ISA PROCEDURE
PROVIDES: PROC INIT_DB( );
SOURCE FILES: \VIEWER\RETRIEVE.BAS
ATTRIBUTES: LANGUAGE = VB
END COMPONENT
256

254 — COMPONENT "RETRIEVE FILENAME" ISA FUNCTION
PROVIDES: FUNC RETRIEVE_FILENAME
(IN CODEUM:INTEGER):STRING
SOURCE FILES: \VIEWER\RETRIEVE.BAS
ATTRIBUTES: LANGUAGE = VB
258

260 — COMPONENT "START VIEWER" ISA EXECUTABLE
PROVIDES: EXEC.MSWORD( );
262 — ATTRIBUTES: EXEPATH=\APPLIC\M?OFFICE\
WINWORD.OXE
END COMPONENT

264 — COMPONENT "VIEW NEW FILE" ISA GUI-FUNCTION
PROVIDES: GUI OPEN_FILE(IN FILENAME:STRING);
ATTRIBUTES: GUIWINDOW="MICRO?UFT WORD"
GUIKEYS="OO1-;
266 — END COMPONENT

FIG. 14

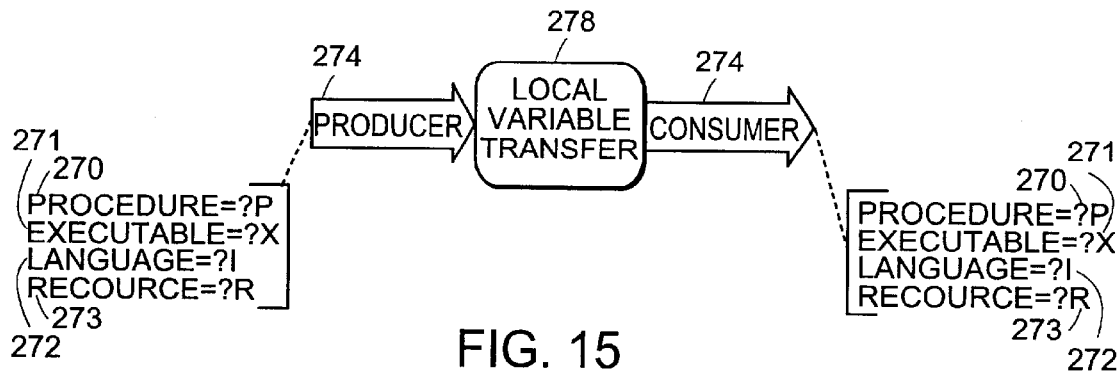
FIG. 15
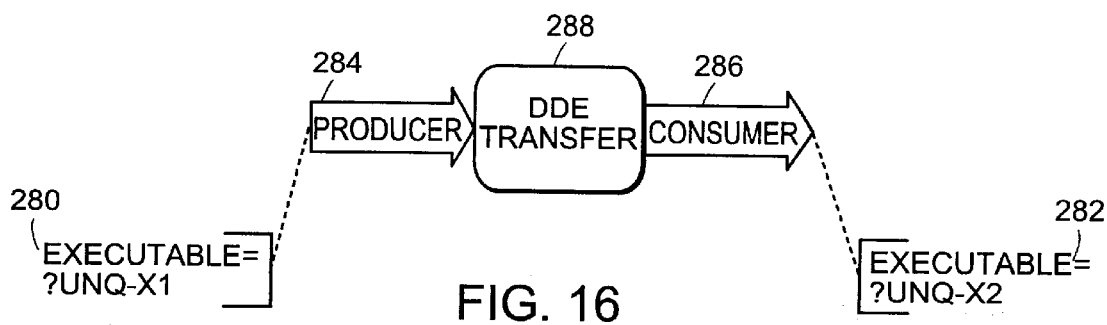
FIG. 16
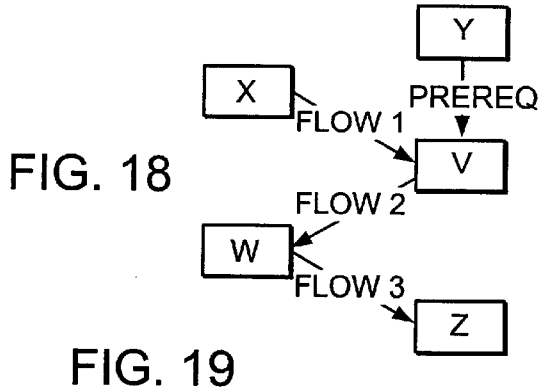
FIG. 18
FIG. 19
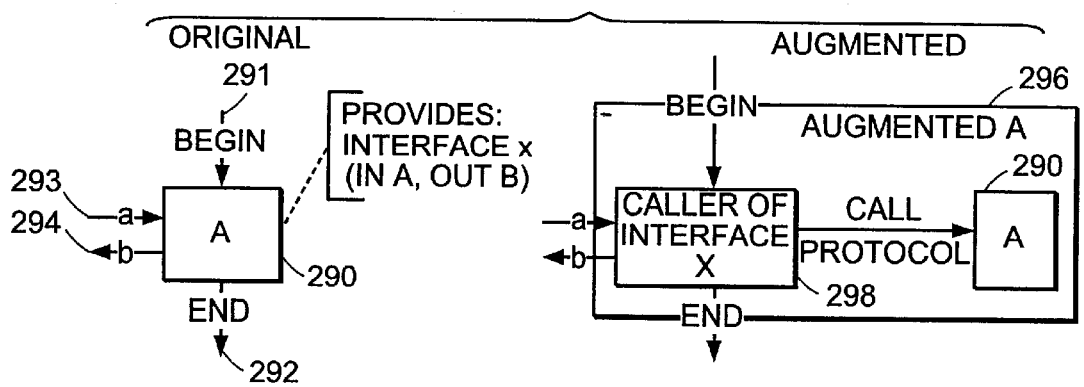

Check_Compatibility( aport, dport )
--                aport = activity port
--                dport = dependency port
-- Returns:    SUCCESS if ports can be legally connected, FAILURE otherwise
-- Uses:       Match_Values( va, vd )

460 - If one port is composite and the other is atomic then return FAILURE.

462 - If both ports are composite then recursively match subports.

464 - If both ports are atomic then
         If aport is same as or a specialization of dport then
                For each attribute defined at both ports (including inherited attributes)
                       If both ends have a value then   call Match_Values
              472     else If one end refers to a variable then
                            If variable has a value then call Match_Values
                            else    Set variable and its equivalence class to value at other end
            470 -                   Return SUCCESS.
                     else If both ends refer to variables
                         If one or both variables have values then do as above.
                         If no variable has a value then
                474 -         Unify both variables into an equivalence class
                             Return SUCCESS.
466 -    else return FAILURE.

468:
Match_Values( va, vd )
--                va = value of attribute at activity side
--                vd = value of attribute at dependency side
-- Returns:    SUCCESS if values match, FAILURE otherwise.

If values are identical then return SUCCESS.
If values are pointers to language elements then 476 -    If va is a specialization of vd*
            then return SUCCESS.
       *Exception: when comparing resources of consumer ports the opposite specialization relationship must hold.
Return FAILURE

FIG. 17

*Input:* A diagram consisting of activities and dependencies
*Output:* A set of executable files implementing the target application 330. Decouple interface dependencies
332. Specialize generic design elements
334. Connect all modules to control
336. Generate executable code

FIG. 25

338 - Recursively scan all activities in the application graph.
      For every activity associated with a code-level component,
340 -        Scan all provided and expected interface definitions of the associated component.
           For every provided interface,
342 -           Get the interface kind.
              If a caller activity has been defined for that interface kind,
344 -              Check for "perfect match" special cases
                  If no "perfect match" interface is found at the other end,
346 -                 Replace the original primitive activity with a composite pattern that includes a caller activity.
           For every expected interface,
348 -           Get the interface kind.
              If a wrapper activity has been defined for that interface kind,
350 -              Check for "perfect match" special cases
                  If no "perfect match" interface is found at the other end,
352 -                 Replace the original primitive activity with a composite pattern that contains a wrapper activity.

FIG. 26

390: Scan graph and build a *to-do list* containing,
- all generic atomic activities (i.e. atomic activities not associated with a code-level component)
- all unmanaged dependencies Repeat the following two operations until to-do list becomes empty,
392:a.  Extract the next generic atomic activity.
        For each executable specialization of that activity stored in the design repository,
396         Apply the compatibility checking algorithm
398         If at least two matching executable specializations are found,
            Ask user to select between them.
        Otherwise,
            Repeat while user input is invalid:
400                 Ask user to provide a specialization for the activity.
                Check validity of user-supplied activity (if must pass the compatibility checking algorithm and either be *atomic and executable* or *composite*
402                 Permanently store new activity in the repository.
        Replace generic activity with selected or user-supplied specialization.
406         Apply Stage 1 of the algorithm to the replacing activity.
        If replacing activity is composite and generic,
408             Scan activity decomposition and add all generic atomic activities and unmanaged dependencies found to the to-do list 394:b.  Extract the next unmanaged dependency
        For each coordination process* associated with a specialization of that dependency stored in the design repository,
410         Apply the compatibility checking algorithm.
        If at least two matching coordination processes are found,
412             Ask the user to select among them.
        Otherwise,
            Repeat while user input is invalid:
414                 Ask user to provide a compatible coordination process.
416                 Check validity of user-supplied process (it must pass the compatibility checking algorithm and either be *atomic and executable* or *composite*)
418                 Permanently store new process in the repository.
420         Manage dependency with the selected or user-supplied coordination process.
422         Apply Stage 1 (Fig. 26) of the algorithm to the managing coordination process.
        If managing coordination process is composite,
424             Scan process decomposition and add all generic atomic activities and unmanaged dependencies found to the to-do list.

\* The term coordination process here also includes atomic software connectors associated with executable dependencies.

FIG. 28

430. Scan the application graph and find all source modules that are not connected to a source of control.
432. Introduce a set of *packaging* executable components, one per host machine and per language for which unconnected source modules exist.
434. Package calls to unconnected source modules inside the main program of the packaging executable corresponding to the host machine and language of each module.
436. Scan the application graph and find all executable programs that are not connected to a source of control.
438. Introduce an *application entry* executable component into the system.
440. Package invocation statements for all unconnected executables inside the main program of the application entry component.

FIG. 29

442 Scan graph and divide into *sequential block subgraphs*\*.
　　For each subgraph,
444　　　　Topologically order activities according to their sequentialization interdependencies.
446　　　　Generate a call statement for each activity.
448　　　　Generate a local variable declaration for each local variable coordination process.
450　　　　Generate appropriate headers and footers for the enclosing sequential block.
452　　　　Save resulting sequential block code into a file.

For each target executable:
454　　　　Collect all source and object files of the executable\*\*.
456　　　　Compile files and place resulting executable into target application directory.

\* Sets of activiteis that will be packaged in the same sequential code block.

\*\*The files are (1) all source and object files referenced in the component descriptions of all activities to be included in the executable, and (2) all coordination code source files generated by step 442 for the target executable.

FIG. 30

COMPUTER SYSTEM AND COMPUTER IMPLEMENTED PROCESS FOR REPRESENTING SOFTWARE SYSTEM DESCRIPTIONS AND FOR GENERATING EXECUTABLE COMPUTER PROGRAMS AND COMPUTER SYSTEM CONFIGURATIONS FROM SOFTWARE SYSTEM DESCRIPTIONS

CROSS-REFERENCE TO RELATED APPLICATIONS

This application is a continuing application which claims the benefit under 35 U.S.C. §120 of application Ser. No. 08/820,913, filed Mar. 19, 1997, now abandoned and under §119(e) of prior provisional application Serial No. 60/013,694, filed Mar. 19, 1996, which are hereby incorporated by reference.

STATEMENTS OF RIGHTS OF THE GOVERNMENT OF THE UNITED STATES

The Government of the United States of America has certain rights in this invention as provided for by the terms of Contract No. IRI-9224093 awarded by the National Science Foundation.

FIELD OF THE INVENTION

The present invention is related to computer systems and computer implemented processes which allow a user to define representations of software systems. The present invention is also related to computer systems for storing multiple alternate implementations of computer programs. The present invention is also related to computer systems and computer implemented processes for generating computer program code from a high level description of a software system.

BACKGROUND OF THE INVENTION

The design and specification of software systems has been studied from many perspectives. Research in software architectures has lead to several languages for architectural description of software systems, including representing architectural taxonomies and specific software architectures.

Software development research has provided a variety of approaches to building software systems, including module interconnection languages, open software architectures such as software bus architectures, object oriented programming, coordination languages and application frameworks. An application framework includes an application programming interface and a set of protocols that guide the way calls to the application programming interface should be used inside components. Research in software reuse has also resulted in the development of software schemas such as the Programmer's Apprentice, and program transformation systems which translate programs between computer programming languages.

Other areas of research in software development include operating systems and concurrent and distributed systems. Additionally, numerous computer related software engineering tools, i.e., automated tools that support various phases of software design and development, also have been developed.

The present invention applies coordination theory to the representation of software systems. Coordination theory focuses on the interdisciplinary study of the process of managing dependencies among activities, in particular, business processes, operation research, organization theory, economics, linguistics, psychology and computer science. Coordination theory has been used as the basis for a representation and design of business processes in a process handbook, as described in PCT publication WO94/19742, published Sep. 1, 1994, also incorporated by reference. This reference does not discuss entities such as ports and resources as described below and how to generate executable code or system configurations from process representations.

Current programming languages and computer system design tools fail to recognize component interaction as a separate design problem, orthogonal to the specification and implementation of the core function of a component. That is, many software components have the built in assumptions about coordination, interoperability and architectural characteristics. Given a set of software components, designers typically either have to modify the code of existing components or have to write additional coordination software that bridges mismatches among components. Such mismatches include low level interoperability mismatches, such as differences in expected and provided procedure names, parameter orderings, data types, calling conventions and other interface mismatches. Another kind of mismatch is an architectural mismatch, such as different assumptions about the architecture of the application in which the components appear. Such mismatches include differences in expected and provided communications protocols, different assumptions about resource ownership and sharing, different assumptions about the presence or absence of particular operating system and hardware capabilities, etc. As design moves closer to implementation, current programming tools increasingly focus on representing components. At the implementation level, software systems are sets of source and executable modules in one or more programming languages. Although modules come under a variety of names and flavors, e.g., procedures, packages, objects and clusters, etc., they are all essentially abstractions for components.

By failing to provide separate abstractions for specifying and implementing interconnection protocols among software components, current programming languages force programmers to distribute such protocols among the interdependent components. As a consequence, code-level components encode, apart from their ostensible function, fragments of interconnection protocols from their original development environments. These fragments translate into a set of undocumented assumptions about their dependencies with the rest of the components in a system. When attempting to reuse components in new applications, such assumptions have to be identified manually and modified, in order to match the new interdependency patterns at the target environment. This often requires extensive modifications of existing code, or the development of additional coordination software.

To this date, there has been no uniform framework for describing the various kinds of component mismatches, or systematic set of rules for dealing with them. Designers generally rely on their own intuition and experience and the problem of component composition is still being confronted in a largely ad-hoc fashion.

SUMMARY OF THE INVENTION

The present invention provides a mechanism for easily integrating existing software components into new applications. It is based on a recognition that a computer software system includes interdependent collections of software components. That is, at the architectural level, software components and their interdependencies are two distinct and equally important entities. The software components represent the core functional pieces of an application and deal with concepts specific to an application domain. Interdependencies relate to concepts which are orthogonal to the problem domain of most applications, such as transportation, sharing of resources and synchronization constraints among components.

An architectural design language is provided which has linguistic support for representing and transforming software architecture diagrams. This language enables a clear separation of the core functional pieces of an application, herein called activities, and their interconnection relationships in context of the application, herein called dependencies. The language also supports entity specialization, a mechanism through which software architectures can be described at various levels of abstraction.

In addition, a design handbook of dependency types and associated coordination processes is provided. Such a handbook is based on the observation that many interconnection problems and software applications are related to a relatively narrow set of concepts, such as resource flows, resource sharing, and timing dependencies. These concepts are orthogonal to the problem domain of most applications, and can therefore be captured in an application independent vocabulary of dependency types. Similarly, the design of associated coordination processes involves a relatively narrow set of coordination concepts, such as shared events, invocation mechanisms, and communication protocols. Therefore, coordination processes can also be captured in a design space that assists designers in designing a coordination process that manages a given dependency type, simply by selecting the value of a relatively small number of design dimensions. The design handbook combines the vocabulary of dependencies in a design space of coordination processes. Such a handbook may reduce the specification and implementation of software component interdependencies to a routine design problem, capable of being assisted, or even automated, by computer tools.

A process for constructing and transforming architectural diagrams of software architectures to integrate executable design elements into code modules is also provided. The process involves applying a series of transformations to an architectural description of a target application. This architectural description may be defined in the architectural design language provided above. Generally speaking, the transformation process includes constructing application architecture diagrams, interactively specializing generic activities, interactively managing unmanaged dependencies between the activities using coordination processes from the design handbook, and integrating executable design elements into code modules.

As a result, the architectural design language, design handbook and transformations provide a system which can accurately and completely describe nontrivial applications and facilitate code-level and architectural-level software reuse.

Accordingly, one aspect of the present invention is an architectural description language which represents activities and dependencies between activities as separate entities. Dependencies are managed by coordination processes associated with the dependency. Activities and dependencies are connected through ports which encode interfaces between activities and coordination processes. The language may also represent resources which may be understood as the outputs of activities that are beyond the scope of the defined software system. Each entity, i.e., activity, dependency, port or resource, may also have attributes which are name value pairs, specifying additional information about the entity. Attributes may be inherited. That is, activities and dependencies may be specialized into particular versions of an activity or dependency. The attributes for a particular activity are inherited by its specializations.

Another aspect of the invention is a computer system which allows a user to define a software system specification, or entities thereof, in the architectural description language in terms of activities and dependencies and their interconnections through ports.

Another aspect of the invention is a computer system which permits entities in this architecture description language to be combined.

Another aspect of the invention is a computer system which checks for compatibility of connected entities in the architectural description language.

Another aspect of the invention is a computer system for storing and accessing stored representations in the architectural description language, including specializations and decompositions of selected representations.

Another aspect of the invention is a computer system which receives definitions of a computer system in terms of its activities, dependencies and ports indicating their connections and specializes a description of generic component elements.

Another aspect of the invention is a computer system which receives a definition of a software system in terms of its activities, dependencies and ports and which decouples dependencies which cannot be managed independently of other dependencies to generate another definition of the software system.

Another aspect of the invention is a computer system for storing a library of coordination processes, including a representation of specific computer programs, each of which is a specialization of a process for managing a dependency, such as resource sharing dependencies, flow dependencies and timing dependencies. It should be understood that there are many types of dependencies, of which the following description includes particular examples. The various combinations of one or more of these example dependencies is an aspect of this invention.

Another aspect of the invention is a computer system which generates executable computer program code from specialized generic software component elements described as combinations of activities, and dependencies having ports for interconnection.

Other aspects of the invention include the various combinations of one or more of the foregoing aspects of the invention, as well as the combinations of one or more of the various embodiments thereof as found in the following detailed description or as may be derived therefrom. It should be understood that the foregoing aspects of the invention also have corresponding computer-implemented processes which are also aspects of the present invention. It should also be understood that other embodiments of the invention may be derived by those of ordinary skill in the art both from the following detailed description of a particular embodiment of the invention and from the description and particular embodiment of a system in accordance with the invention.

The various aspects of the invention enable reuse of code-level components. Designers can generate new applications simply by selecting existing components to implement activities, and coordination processes to manage dependencies, independently of one another. The development of successful frameworks for mapping dependencies to coordination processes reduces the step of managing dependencies to a routine one, and enables it to be assisted or even automated by design tools. Overall, new applications can be generated with minimal or no need for user-written coordination software.

The various aspects of the invention also enable reuse of software architectures. Designers can reuse the same architectural description in order to reconstruct applications after one or more activities have been replaced by alternative implementations. A designer simply may semi-automatically remanage the dependencies of the affected activities with the rest of the system. Furthermore, designers may reuse the same set of components in different execution environments by managing the dependencies of the same architectural description using different coordination processes, appropriate for each environment.

The various aspects of the invention also enable insight into software organization alternatives. The description of software applications as sets of components interconnected through abstract dependencies may help designers to structure their thinking about how to best integrate the components together. A design space of coordination processes for managing interdependency patterns may assist them to explore alterative ways of organizing the same set of components, in order to select the one which exhibits optimal design properties.

BRIEF DESCRIPTION OF THE DRAWING

In the drawing,

FIG. 10 illustrates a data structure for an entity object;

FIG. 11 illustrates a structure for a specialization object or table;

FIG. 12 illustrates the structure of a decomposition representation;

FIG. 13 illustrates a structure for representing a connector;

FIG. 14 is a diagram representing component definitions in accordance with one embodiment of the invention;

FIG. 15 illustrates a constraint on attributes for a dependency;

FIG. 16 illustrates constraints on attributes for an activity;

FIG. 17 represents pseudocode describing how compatibility of activities and dependencies is checked;

FIG. 18 illustrates an example process where interface dependencies force joint management to flow dependencies;

FIG. 19 is a diagram illustrating the augmentation of an activity by introducing a caller;

FIG. 25 is a flow chart describing how an application is generated from a representation of the application as activities and dependencies;

FIG. 26 is a flow chart describing how interface dependencies are decoupled;

FIG. 28 is a more detailed flow diagram of the flow chart of FIG. 27;

FIG. 29 is a flow chart describing how all modules are connected to a source of control;

FIG. 30 is a flow chart describing bow executable code is generate from specialized generic design elements;

DETAILED DESCRIPTION

The present invention will be more completely understood through the following detailed description which should be read in conjunction with the attached drawing in which similar reference numbers indicate similar structures.

Figure 1:
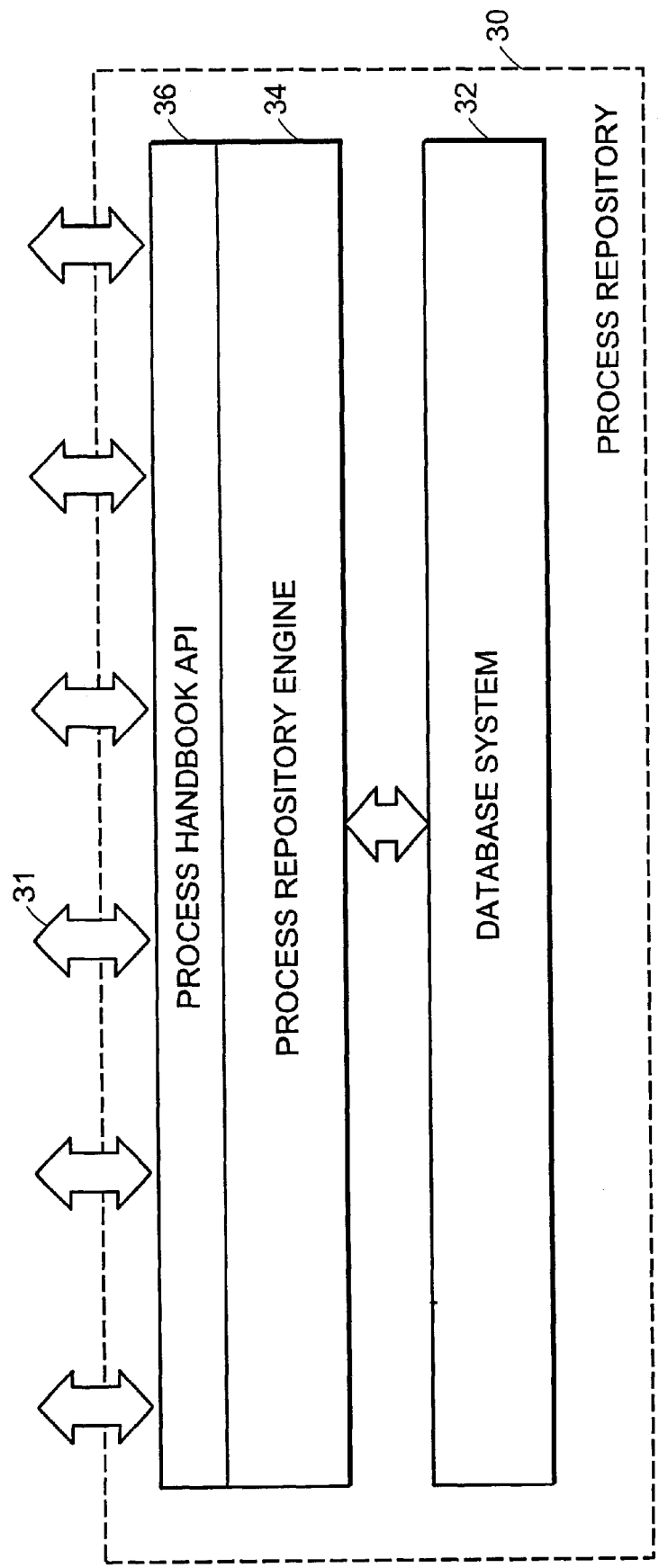
FIG. 1 is a block diagram of a process repository in an application development system in accordance with one embodiment of the present invention.
Figure 2:
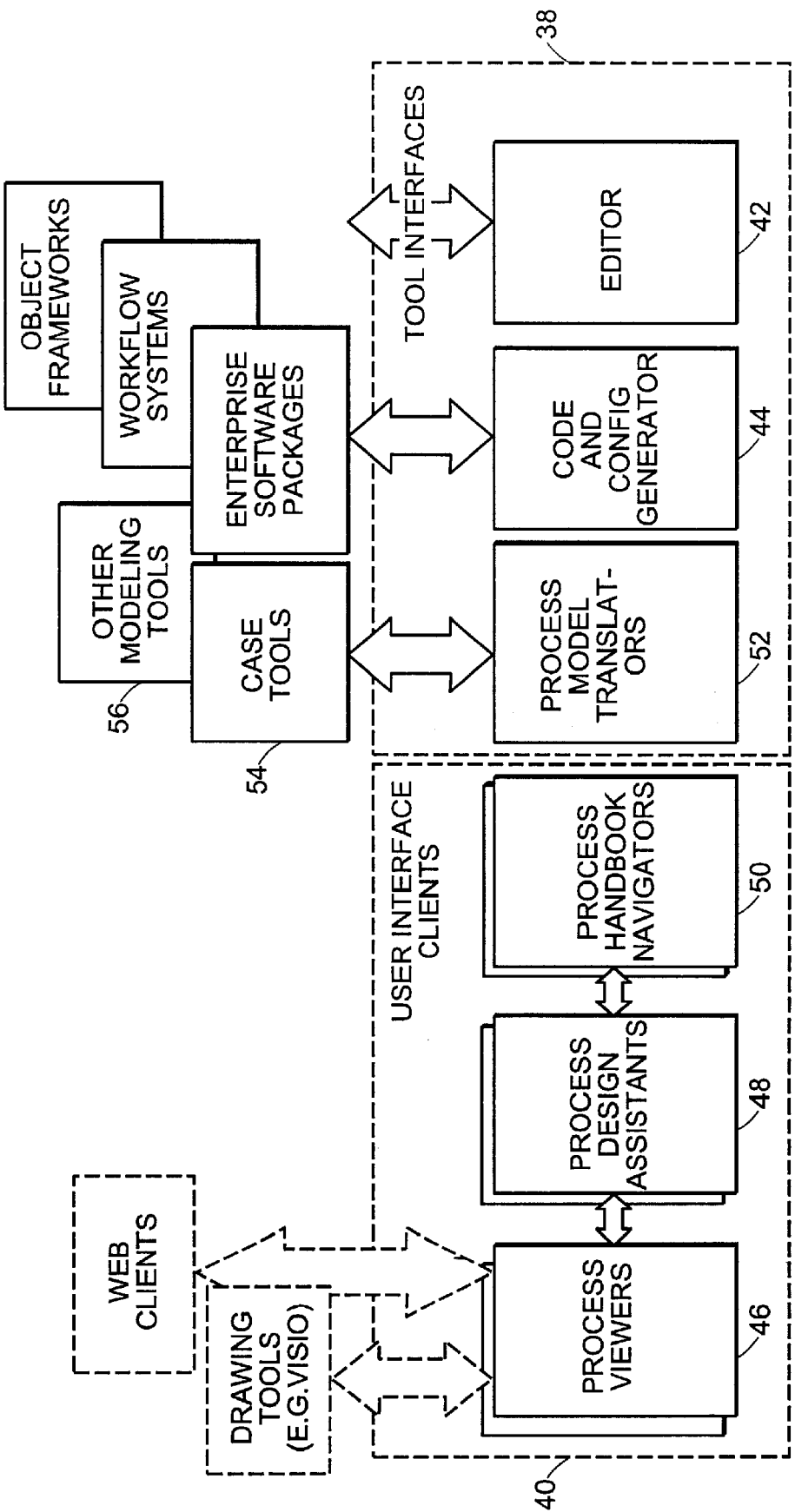
FIG. 2 is a block diagram of tools and clients that may access the process repository in FIG. 1.

Referring now to FIGS. 1 and 2, components of one embodiment of the present invention are shown. FIG. 1 illustrates one embodiment of a process, or entity, repository 34. This repository includes a database 32 for storing representations of entities defining a process and a process repository engine 34 that accesses and interprets these representations in order to allow a user to create new process definitions, modify existing process definitions and/or read process definitions. The process repository also causes properties defined for an entity to be inherited by its specializations, as will be described below. A user accesses operations of the process repository engine via an application programming interface (API) 36. The API may be accessed over a network to provide a form of client/server interaction, including over the Internet. The process repository, as described in more detail below may be implemented, for example, using a relational database as the database system 32, or using an object-oriented application development system as the database system 32, or by using other techniques. The object-oriented application development system has the capability to control the specialization of process entities. Using a relational database, such specialization is performed by the process repository engine 34 using appropriate software with functionality similar to the object-oriented development system.

The process repository 30 is connected, as shown by arrows 31, to other applications as shown in FIG. 2. In particular, a user may access the process repository 30 using various tools 38 or user interfaces 40 that provide primarily viewing capability. One of the tools, an editor 42, allows a software architecture to be defined on the computer by a user using an architectural description language defined according to a process representation described in more detail below. This language represents a process by specifying entities which define a process, such as activities, dependencies, ports and resources. These entities may be decomposed into other entities and/or may be specialized or specializations of generic kinds of entities. Additionally, editor 42 includes a component description language editor which is used to represent executable components that may be associated with the individual entities. An example editor 42 will be described in more detail below in connection with FIG. 17.

Another tool is a code and configuration generator 44 which transforms process descriptions into executable program code, configurations of enterprise software packages, workflow systems or object frameworks. This code generator also facilitates reuse of software components and can be used for rapid prototyping of software applications from existing software components. A similar tool is a process model translator 52 which translates a process description into a description in another language, such as for a computer aided software engineering (CASE) application program 56 or other modeling tools 58. As will be described below, the process representation used in the present invention defines an architectural description language and can be readily translated to other formats using standard parsing techniques.

The user interface clients 40 typically provide for retrieval and viewing of process descriptions, such as a process viewer 46 typically using a browser interface such as an HTML browser or a drawing tool, such as VISIO from Shapeware Corporation. More functionality may be provided by a design assistant 48 which permits a user to see various decompositions and specializations of a process, in particular for comparison and selection of processes that implement coordination processes as described below. Other client programs, such as a process handbook navigator may be used to view processes, their decompositions and their various specializations, particularly enabling comparison of alternative processes for performing a task.

Figure 3:
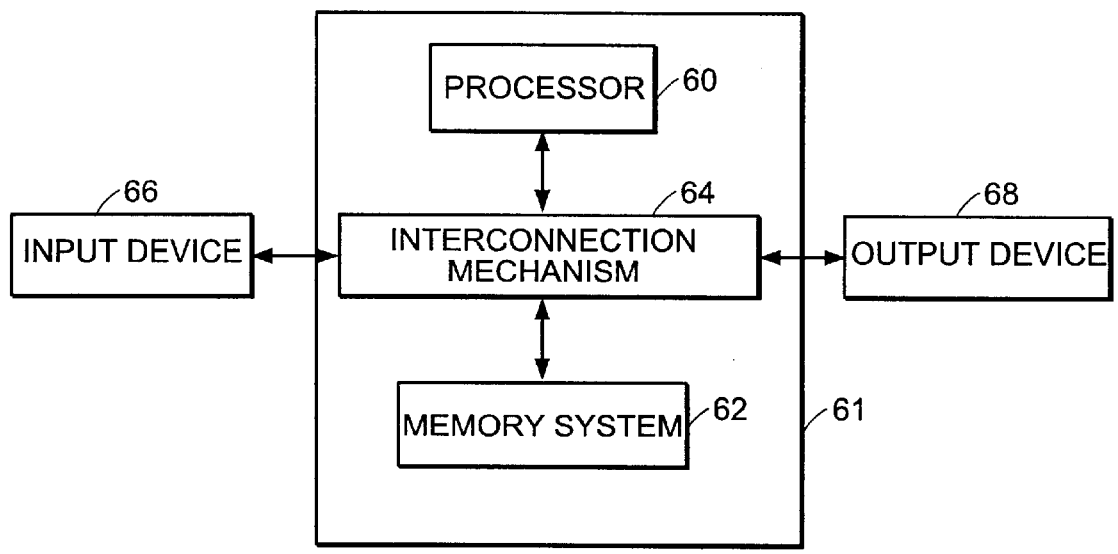
FIG. 3 is a block diagram of a computer system with which an embodiment of the present invention may be implemented.

A computer system which may be used to implement the present invention will now be described in connection with FIG. 3. This diagram illustrates components of a general purpose computer system that can be used to implement the present invention. This description is provided by way of example only and is not intended to be exhaustive or limiting. This computer system includes a main unit 61 which is connected to an output device 68 such as a display and an input device 66, such as a keyboard. The main unit generally includes a processor 60 connected to a memory system 62 via an interconnection mechanism 64. The input device and output device also are connected to the processor and memory system via the interconnection mechanism.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, audio input and scanner. It should be understood the invention is not limited to the particular input or output devices used in combination with the computer system or to those described herein.

The computer system may be a general purpose computer system which is programmable using a high level computer programming language, such as "C, or "Pascal." The computer system may also be specially programmed, special purpose hardware. In a general purpose computer system, the processor is typically a commercially available processor, of which the series x86 processors, available from Intel, and the 680X0 series microprocessors available from Motorola are examples. Many other processors are available. Such a microprocessor executes a program called an operating system, of which UNIX, DOS and VMS are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

The memory system 62 in a typical general purpose computer system usually includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

It should be understood the invention is not limited to a particular computer platform, particular processor, or particular high-level programming language. Additionally, the computer system 20 may be a multiprocessor computer system or may include multiple computers connected over a computer network.

Referring again to FIGS. 1 and 2, the entity repository 30, tools 38 and user interface clients 40 all may be implemented using computer programming language tools and/or data management tools. Each of these components uses and/or manipulates a representation of processes or software architectures, which also may be called an architectural description language. This architectural description language will now be described in more detail. The following description is based on the representation of software architectures, however it also is generally applicable to other processes.

The architectural description language clearly separates core functional pieces of an application from their application specific patterns of interdependencies. This separation can be provided by supporting two distinct language elements: activities, for representing a core functional parts and dependencies, for representing interconnection relationships among activities.

The language also separates the specification of the system architecture from the implementation of the elements being structured. In particular, activities may be associated with an optional code level component, such as a source code module, an executable program, or a network server. Similarly, dependencies can be associated with an optional coordination process, representing a protocol for managing the relationship described by the dependency. Such a separation enables components for implementing activities to be selected or replaced independently of one another. This independence is possible because the specification level interdependencies do not change. However, different component implementations might influence the implementation of interaction protocols. This separation also allows an application to be ported to different configurations. Again, this portability is possible because specification level relationships of activities do not change. Rather, the implementation of interaction protocols is most likely to change across configurations.

This architectural inscription language also makes it possible to connect the specification of a system architecture to the implementation of the elements being structured through well-defined structural transformations. As a result, executable applications can be generated directly from a software architectural diagram, as will be described in more detail below. In one embodiment of the invention, a mechanism herein called entity specialization allows generic application architectures to be transformed to executable systems by selection of successively specialized activities and dependencies contained in the architectural decomposition.

The architectural description language also supports the specification and confirmation of compatibility restrictions and configuration constraints on the interconnection of the application elements. That is, when connecting or transforming language elements in an architectural description, a limited static checking of compatibility of these elements is performed, similar to type checking in programming languages. This capability facilitates the construction of correct architectural descriptions and helps designers focus their attention on more complex issues. In one embodiment of the invention, this specification and confirmation of compatibility restrictions and configuration constraints is based on a mechanism which matches attribute values of the language elements to be connected. This mechanism is described in more detail below after a more detailed description of the architectural description language and the entity specialization mechanism.

Figure 4:
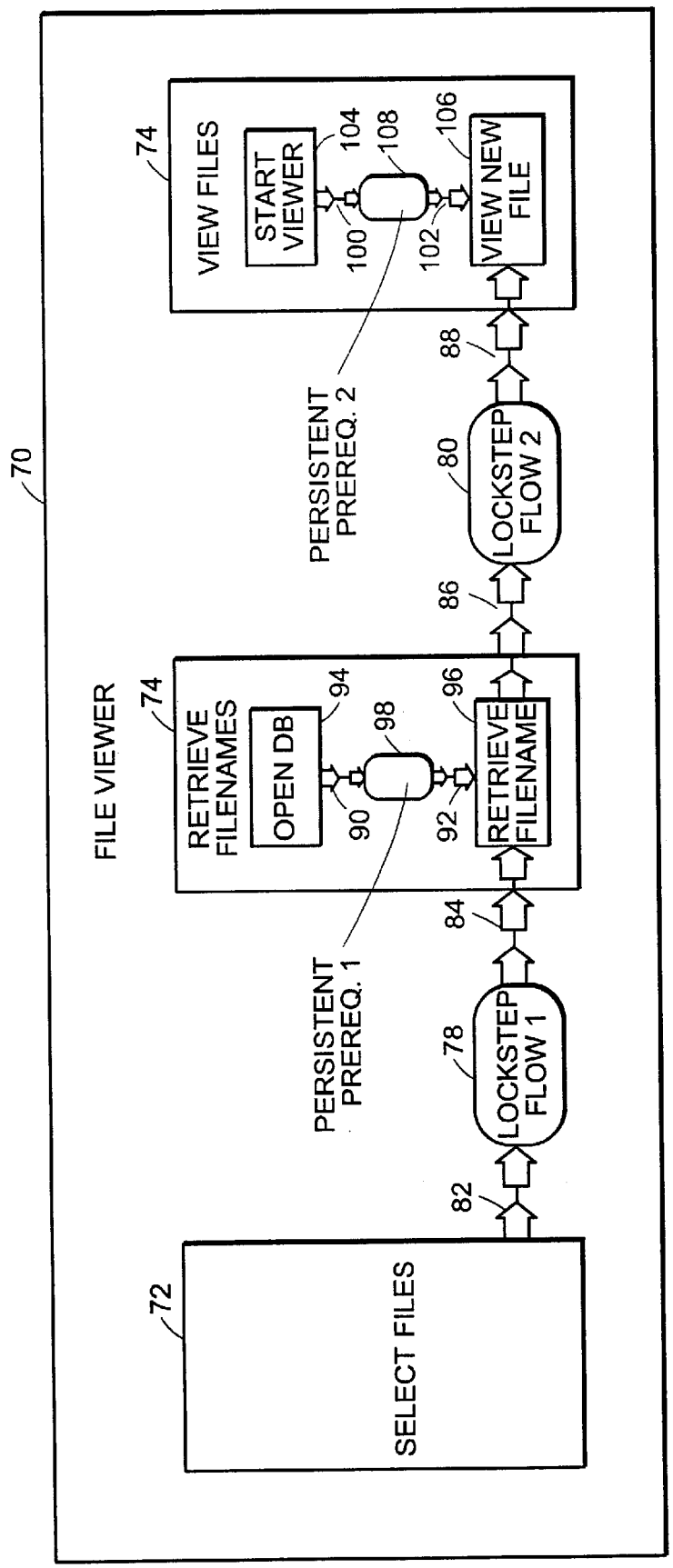
FIG. 4 is a block diagram of a system as viewed in accordance with an architectural description language as used in the present invention.

One embodiment of an architectural description language in accordance with the present invention will now be described in connection with a representation of an example application using this language. FIG. 4 illustrates the structure of the file viewer application 70 independent of the implementation of its elements, i.e., it illustrates a generic specification-level view of the application. A file viewer generally allows a user to input a code number and in response to view the contents of a retrieved file having a file name matching the user supplied code number. Such a system includes three application subsystems, each of which corresponds to different activities. These activities include select files 72, retrieve file names 74 and view files 76. These activities are interconnected by dependencies 78 and 80. Activity 72 is atomic while activities 74 and 76 are composite, i.e., they decompose into patterns of simpler elements. The entire application 70 is also defined as a composite activity. Dependencies 78 and 80 encode relationships among the activities and connect producers and consumers of data resources. In this application, they indicate that user supplied code numbers flow from the user interface to the file name retrieval subsystem. Likewise, retrieved file names must flow from the file name retrieval to the file viewing subsystem.

Activities and dependencies are connected together via ports which are connected at 82, 84, 86 and 88. Activity ports are connected to a corresponding dependency port using an object called a wire, drawn as line segments in the diagram. Within activity 74, ports connected at 90 and 92 connect the open database 94 and retrieve file name 96 activities via prerequisite dependency 98. Similarly, in activity 76, ports connected at 100 and 102 connect the start viewer 104 and view new file 106 activities via prerequisite dependency 108. The dependency has an associated resource not shown, which in this case is a file.

This example application illustrates four primary elements of the language, namely activities, dependencies, ports and resources. Any of these four elements may contain an arbitrary number of additional attributes. Attributes are name value pairs that encode additional information about the element. They are used to express compatibility restrictions that constrain the connection of elements. Each of the entities, or a specialization of it, has a corresponding implementation level entity that implements the intended functionality of the entity. These are defined as attributes of the respective activities, dependencies and ports and are called software components, coordination processes, software connectors, respectively. For resources, these attributes may represent data, control, hardware or system resources.

More details of this language will now be described in connection with FIGS. 5 to 16. As stated above, there are four primary elements of this language: activities, dependencies, ports and resources. Activities represent the main functional pieces of an application. Interconnections among activities are explicitly represented as separate language elements, called dependencies. Activities must always connect to one another through dependencies. Both activities and dependencies have a set of ports, through which they interconnect with the rest of the system. As a consequence, every activity port must be connected to a compatible dependency port.

Activities

Activities are defined as sets of attributes which describe their core function and their capabilities to interconnect with the rest of the system. The two most important activity attributes are a decomposition and a component description. Decompositions are patterns of simpler activities and dependencies which implement the functionality intended by the composite activity. The ability to define activity decompositions is the primary abstraction mechanism in the language. A component description connects an activity with a code-level component which implements the intended functionality. Examples of code 4 level components include source code modules, executable programs, network servers, configuration files for enterprise systems, etc. Component descriptions are described in more detail below in connection with an example implementation.

Depending on the values of the decomposition attribute, an activity is either atomic or composite. Atomic activities have no decomposition. Composite activities are associated with a decomposition into patterns of activities and dependencies. Depending on the values of the component description attribute, an activity is either executable or generic. Executable activities are defined at a level precise enough to allow their translation into executable code. Activities are executable either if they are associated with a component description, or if they are composite and every element in their decomposition is executable. Activities which are not executable are called generic. To generate an executable implementation, all generic activities must be replaced by appropriate executable specializations. A primitive entity is both atomic and executable.

Activity decompositions are subject to structural restrictions. In particular, all free ports (described in more detail below) of activities contained in the decomposition, i.e., ports not connected to other decomposition elements, must be connected to compatible ports of the composite activity. In other words, the external points of interaction of a composite activity with the rest of the system are equal to the points of interaction of its decomposition, minus the interactions that are internal to the decomposition. Another restriction is that dependencies contained in an activity decomposition can have no free ports. In other words, if a dependency is included in a decomposition, all of its ports are connected to activities included in the same decomposition. Dependencies that span composite activities are defined outside of any of them because of the restriction that activities are connected to one another through intermediate dependencies.

As discussed above, executable activities are ultimately implemented by associating them with software components that perform the desired functionality. Software components are code-level software entities, such as source code modules, executable programs, user-interface functions, network services, etc. Dependencies and ports, on the other hand are associated with coordination processes and software connectors, respectively. While the latter may be more easily represented in this system, in order to properly integrate software components into executable systems, this representation should have some information about their interfaces, source and object files, and other related attributes. A notation, herein called a component description language (CDL) may be used to describe the properties of software components associated with executable activities. These definitions are stored in the corresponding executable activity.

One implementation of the component description language will now be described in connection with FIG. 14. This figure illustrates sample component descriptions of the components associated with the five executable activities in FIG. 4. In general, a component description includes information about the kind of component, the provided interface of the component, the expected interfaces of other components, source and object files needed by the component, and additional attributes specific to the component. Each part of the component description will now be described more detail.

Definitions of arbitrary kinds of software components, such as a source module, executable program, user-interface function, etc., may be supported by representing each component kind by a different keyword. Table I describes some example component kinds, and is not intended to be either exhaustive or limiting. This table could be extended, for example, by adding a component type for representing configuration files for enterprise software packages or workflow systems.

TABLE I

| Component Type | CDL Keyword | Description |
| --- | --- | --- |
| Source procedure | proc | A source code procedure or equivalent sequential code block (subroutine, function, etc.) |
| Source module | module | A source code module, consisting of one or more source code files and containing its own entry point (main program). Modules interact with the rest of the system through expected interfaces only. |
| Filter | filter | A source code procedure that reads its inputs from and/or writes its outputs to sequential byte streams |
| Executable | exec | An executable program |
| DDE server | ddes | A DDE server embedded inside an executable program |
| OLE server | oles | An OLE server embedded inside an executable program |
| Gui-Function | gui | A function provided by the graphical user interface of some executable program, typically activated through a key sequence |

The provided component interface, through which a software component interacts with other components, specifies the input-output interface of the component. Depending on the component kind, such interfaces might correspond to procedure parameter lists, executable program command line invocation interfaces, user interface functions activation key sequences, etc. When associating software components to executable activities, each element of the provided interface is mapped to a corresponding atomic port of the activity.

Expected interfaces of other components are also represented because most currently used software components make assumptions about the existence of other components or services in the system. For example, a source module might call an externally defined procedure with a specified name and parameter interface. A Microsoft Windows executable program might assume the existence of a DDE server application with given specifications. Such expectations are documented in this section, using a syntax identical to the one used to define the component's provided interface. When associating software components to executable activities, each element of each expected interface is mapped to a corresponding atomic activity port.

Files needed by a software component are usually pieces of code, residing in one or more source or object files. The relevant set of files to be eventually included in the final application are therefore specified.

Additional component attributes often need to be specified. Examples of such attributes include the programming language (for source components), the invocation path name (for executable programs), the service and topic names (for a DDE server component), the activation, event or key sequence (for user-interface services), etc. There are also optional attributes, such as restrictions on the target environment or host machine.

As an example, referring now to FIGS. 4 and 14, the activity Select Files has a corresponding component description 240. This description indicates that this activity is associated with procedure (as indicated at 240) that provides an interface (as indicates at 244) to a C source code function, called "select_files". This function, for example, may contain an internal loop that repeatedly asks users for a code number. For each user-supplied code number, it calls function_view selected_files, to which it passes the user-supplied code number as an argument. Function view_selected_files is not part of this module and is expected to exist somewhere in the same executable, as indicated at 246. Its single parameter "codenum" is mapped to a corresponding producer port of activity Select Files. File select.c contains the source code and data definitions for select_files and any other internal functions it may call, as indicated at 248. Similarly, activities Open DB 252 and Retrieve Filename 254 are associated with Visual Basic procedures defined in file retrieve.bas as indicated at 256 and 258.

Activity Start Viewer 260 is associated with an executable program (Microsoft Word, a commercial text editor). Enactment of the activity corresponds, in this case, to invoking the program. The component's CDL provided interface 262 describes the command line parameters for starting the program. In this case there are no command line parameters, other than the program path name.

Finally, activity View New File 264 is associated with a graphical-user-interface function offered by the text editor as indicated at 266. In order to display a new file, the text editor normally expects to receive a key sequence in its main window, consisting of the character CTRL-O, followed by the required filename. followed by a newline character. Thus, this service expects one abstract data resource (the filename), embedded in a key sequence whose generic format is described by attribute guiKeys. In this example, guiKeys contains the characters ^O (=CTRL-O), followed by @1 (=the value of the first interface element, in this case the filename), followed by ~(=newline). Finally, attribute guiWindow specifies the title of the editor's main window, where the activation key sequence must be sent.

Dependencies

Figure 5:
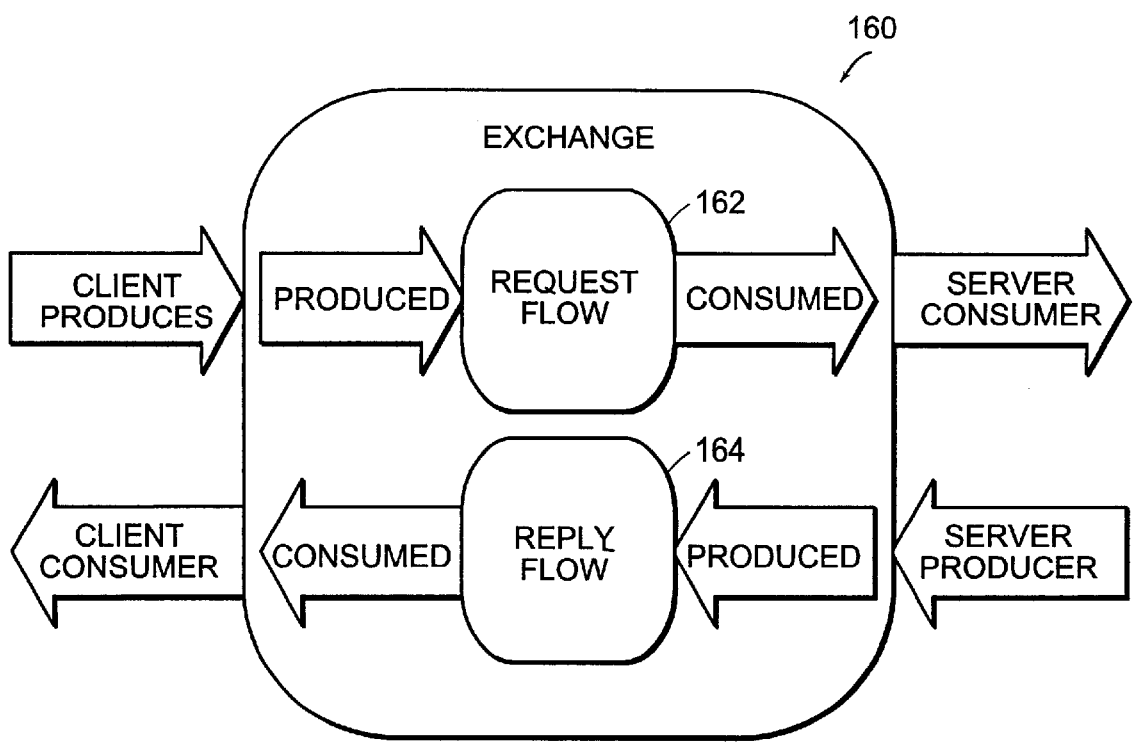
FIG. 5 is a diagram illustrating an example dependency decomposition.

Having now described activities in some detail, dependencies will now be described in connection with FIGS. 5 and 6. Dependencies describe interconnection relationships and constraints among activities. Traditional programming languages do not support a distinct abstraction for representing such relationships and implicitly encode support for component interconnections inside their abstractions for components. In contrast, in the present invention, interconnections among activities are explicitly represented using dependencies.

In the example application in FIG. 4, a flow dependency indicates that user-supplied code numbers must flow from the user interface to the filename retrieval subsystem. Likewise, retrieved filenames flow from the filename retrieval to the file viewing subsystem. Prerequisite dependencies (labeled Persistent Prereq) indicate that the filename database is opened (once) before any filename retrieval takes place, and that the file viewer subsystem is initialized (once) before any file can be displayed.

Like activities, dependencies are defined as sets of attributes. One attribute is an optional decomposition into patterns of simpler dependencies that collectively specify the same relationship with the composite dependency. A second optional attribute is a coordination process. A coordination process is an activity, or a pattern of simpler dependencies and activities that describe a mechanism for managing the relationship or constraint implied by the dependency. Another attribute is an optional association with a software connector. Connectors are low-level mechanisms for interconnecting software components that are supported directly by programming languages and operating systems. An example software connector is the design-time ordering of program statements in the same sequential code block, which manages prerequisite dependencies. As another example, local variable transfer manages flow dependencies. Another example is a UNIX pipe protocol which is a form of transport of data from one process to another. Other examples include procedure calls, method invocations, shared memory, etc.

Depending on the values in the above attributes, a dependency may be either atomic or composite. Atomic dependencies have no decomposition. Composite dependencies are associated with patterns of simpler dependencies that specify the same relationships. A dependency also may be either managed or unmanaged. Managed dependencies have an associated coordination mechanism, specifying one way of managing the interconnection relationship they represent. Unmanaged dependencies have no associated coordination process. They simply specify the existence of a relationship and must be specialized by appropriate managed dependencies before code generation can take place. A dependency also may be executable or generic. Executable dependencies are defined at a level specific enough to be translated into executable code. Dependencies are executable if one or more of the following conditions hold: (1) they are directly associated with a code-level connector, (2) they are composite and all elements of their decomposition are executable, or (3) they are managed and all elements of their coordination process are executable.

Arbitrary dependency types may be defined. However, it is preferable to make routine the step of specifying and managing dependencies in the transformation of an architectural description into executable code. For that reason, it is useful to define a standardized vocabulary of common dependency types that covers a large percentage of activity relationships encountered in software systems. Such a vocabulary is described in more detail below. One common dependency is a prerequisite dependency, which requires a first activity to be completed before a second activity may start. A flow dependency represents a producer/consumer relationship between activities. A mutual exclusion dependency is a constraint often imposed for managing access to a shared resource.

Some dependencies can be equivalently described by patterns of simpler dependencies. Such patterns are called dependency decompositions and are defined as attributes of composite dependencies. FIG. 5 shows an example of a composite dependency 160 and its decomposition. In particular, the dependency represented by a client/server exchange may be further decomposed into two flow dependencies: a first 162 which handles the request from the client (as a producer) and provides it to the server (as a consumer), and a second 164 which handles the reply from the server (as a producer) and provides it to the client (as a consumer).

Dependencies specify interconnection relationships which translate into needs for interaction among a set of activities. To generate executable systems, dependencies must be managed by inserting appropriate interaction or coordination mechanisms into the system. By providing an abstraction for specifying a coordination process as an attribute of dependencies, the definition of such interaction mechanisms can be localized.

Coordination processes are patterns of simpler dependencies and activities. In that sense, they are very similar to activity decompositions. Coordination decompositions have ports defined by corresponding dependencies while activity decompositions have ports defined by corresponding activities. Accordingly, coordination processes have structural restrictions, which mirror the restrictions for activity decompositions, discussed above. In particular, all free ports of dependencies contained inside a coordination process, i.e., ports not connected to other elements of the coordination process, must be connected to compatible ports of the associated dependency. In other words, external points of interaction of a coordination process with the rest of the system are equal to the points of interaction of its elements, minus the interactions that are internal to the coordination process. In addition, activities contained inside a coordination process can have no free ports. If an activity is included in a coordination process, all of its ports must be connected to dependencies included in the same coordination process. Activities that span coordination processes must be defined outside of any of them. Dependencies are connected to one another through intermediate activities.

Figure 6:
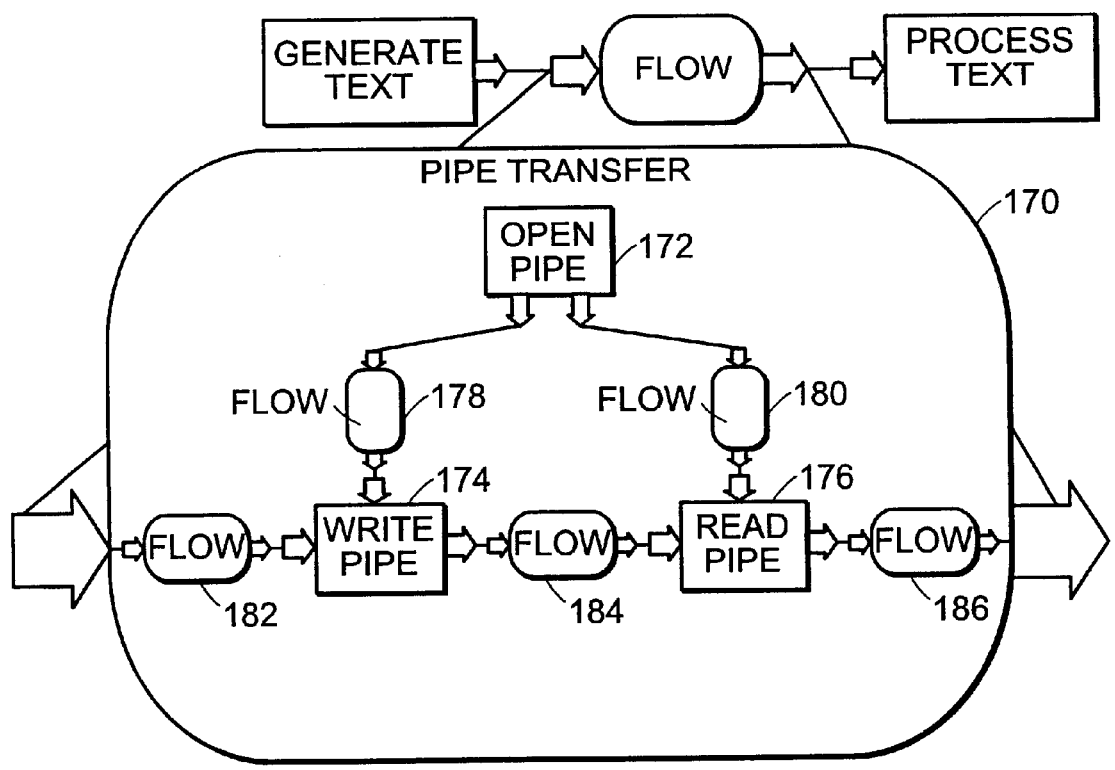
FIG. 6. is a diagram illustrating a coordination process associated with a flow dependency.

FIG. 6 shows an example coordination process 170 that implements a pipe channel protocol, i.e., that manages one-to-one flow dependencies. It is a pattern of three activities 172, 174 and 176, and five lower-level flow dependencies 178, 180, 182, 184 and 186.

Ports

Figure 7A:
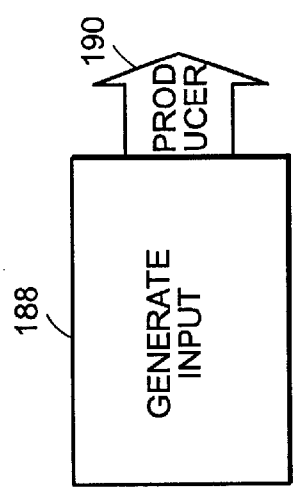
FIG. 7(a) illustrates a generic activity containing a generic producer port.
Figure 7B:
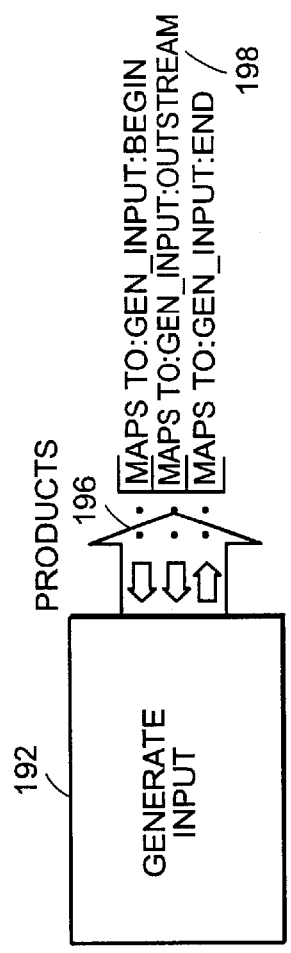
FIG. 7(b) illustrates an executable specialization of the activity of FIG. 7(b)

Having now described dependencies in some detail, the connectivity between activities and dependencies, herein called ports, will now be described in more detail in connection with FIGS. 7(a)–7(c). Ports encode abstract interfaces, or needs for interaction among activities. All such interactions are the result of the existence of dependencies among the interacting activities. The existence of a dependency usually requires the introduction of a coordination process to manage the dependency and to ensure smooth interaction of the interdependent components. All connections between language elements are done through ports. Primitive port types include, but are not limited to, (resource) producer ports, (resource) consumer ports, begin ports and end ports. Arbitrary port types can be defined.

For example, in FIG. 4 the activity Retrieve Filename 74 has three ports. Two of them are data resource ports, encoding the fact that this activity needs to receive data resources of type Integer, i.e., the code number, and that this activity produces data resources of type String, i.e., the filename. The third port is a Begin control port, encoding the fact that flow of control into the activity follows the completion of activity Open DB.

As is the case with activities and dependencies, ports may be distinguished into composite and atomic ports. Composite ports act as abstract port specifications, describing the logical role of the port in the system. They decompose into sets of simpler ports, which might themselves be composite or atomic. Atomic ports map directly to an element of some implementation-level component interface, as will be described below. A user may define new ports as specializations of other types of ports, or define completely new port types, just as activities and dependencies may be defined.

A built-in port hierarchy implies that atomic ports are either input or output ports of data or control. Atomic data ports are mapped to atomic interface elements of software components or executable coordination processes. The mapping is performed by setting an attribute, e.g., "MapsTo," at the port to a string indicating the respective interface element. Depending on the component kind, an atomic port might thus correspond to a source procedure parameter, a command line argument, a user-interface-function activation key sequence, an event detected or generated by a program, an object generated or used by an executable program, etc. All atomic data ports contain an attribute named Resource, which lists the data type expected to flow through the port.

Atomic control ports, on the other hand, model the flow of control in and out of an activity or coordination process. Every activity has at least one pair of control ports modeling the beginning and end of execution of the activity. These ports are called the Begin and End ports. Complex activities might have additional control ports, modeling, for example, periodic calls to other activities that take place during the life of the original activity.

Sets of atomic ports may be grouped inside composite ports. Arbitrary port types may be defined. For example, producer and consumer ports specify the production and consumption of abstract resources. Designers might want to use composite ports for two reasons. First, they may be used to indicate sets of logically related interface elements in a given implementation. Second, they may be used to indicate generic needs of interaction when designing generic entities. Different specializations of a given generic entity might contain different decompositions of the same composite port, corresponding to the variety of interfaces by which a given abstract need for interaction can be implemented. An example of the use of composite ports will now be described in connection with FIGS. 7(a)–7(c), using the example application of a "File Viewer" from FIG. 4 which processes the contents of an input file.

One of the activities in the File Viewer application makes the contents of a file available to the rest of the system. Initially in the design process, the exact implementation and interface of the component that will implement that activity is not known. Therefore, a generic activity 188 called Generate Input may be specified, as illustrated in FIG. 7(a), and may include a generic producer port 190 through which the contents of the input file are made available to the rest of the system. In the application diagram, that producer port is connected to dependency ports connecting it to the consumer activities.

There are at least two ways to implement the Generate Input activity. FIG. 7(b) shows a filter implementation. The activity 192 is associated to a component using a component description 194 in a form described below. This component writes its output to an externally opened sequential byte stream. The same byte stream is read by consumer activities to retrieve the contents of the input file. In this case, the composite producer port 196 is decomposed into a data input port 198, corresponding to the file descriptor of the sequential byte stream that must be passed to the filter. In this case, a composite producer port, i.e., output port, decomposes into an atomic data input port.

Figure 7C:
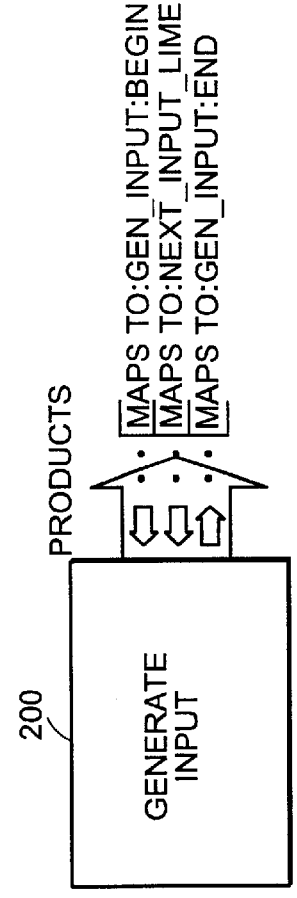
FIG. 7(c) illustrates an alternative executable specialization of the activity of FIG. 7(a)

FIG. 7(c) shows another way to implement the Generate Input activity. In this example, the activity 200 is associated with a component using component description 202. For each line of the input file, the second implementation calls a procedure which is expected to have been defined externally. The activity 200 passes the current input line as a string parameter to the procedure. In this case, the composite input port 204 decomposes into a data output port 206, corresponding to the string parameter of the procedure called by the component.

By default, every composite activity port includes the Begin and End ports of its associated activity in its decomposition. Activity ports are directly connected to coordination process ports. Coordination processes often need to control what happens before or after the execution of an activity. This requires them to have access to the Begin and End ports of an activity. In actual practice, this requirement is frequent enough that Begin and End ports are included in the decomposition of every composite activity port by default.

Resources

Figure 8:
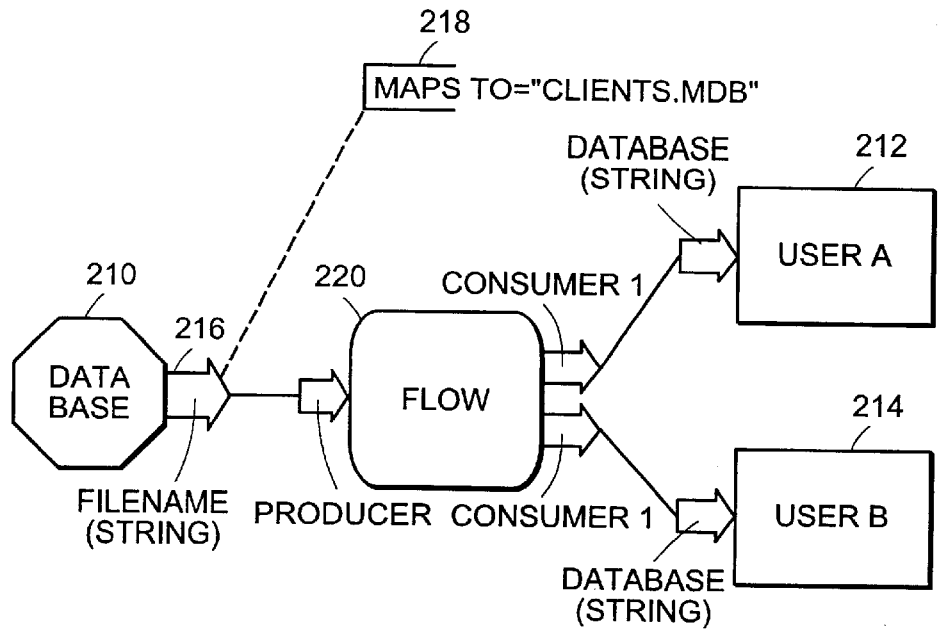
FIG. 8 is a diagram illustrating an example of a resource entity.

Having now described activities, dependencies and ports, another kind of entity, herein called a resource, will now be described in connection with FIG. 8. Most interactions among software components center around the flow and sharing of various kinds of resources. In most cases, resources are dynamically produced during run-time, as a result of execution of activities. Such dynamically produced resources are implicitly modeled through producer ports. As mentioned in the previous section, ports contain special attributes which describe the data type, or other properties, of the resources that flow through them. In many software applications, however, some resources have been created outside of the scope of the application. Examples include hardware resources, such as a printer, and resources produced by other applications, such a as a database.

Such preexisting resources may be represented using a special resource language entity. Like activities, resource entities have ports, through which they are connected to the rest of the system. Atomic activity ports, are associated with interface elements of software components. In contrast, atomic resource ports are bound to constant data values, which usually correspond to resource identifiers. FIG. 8 depicts an example of the use of a resource entity 210 which indicates a preexisting database file which is being shared by two activities 212, 214 in this application. The Database resource has a single port 216, which is bound to the filename of the database file as indicated at 218. This filename is made known to the two user activities, through a flow dependency 220, in order for them to be able to access the database.

Attributes

All primary entities of the language, i.e., activities, dependencies, ports and resources, may contain an arbitrary number of additional attributes. Attributes are name-value pairs that encode additional information about the element. Attribute values can be scalar, lists, or pointers to other entities. Attributes are useful in determining compatibility of an entity with other entities in the system and for integrating components and coordination processes into sets of executable modules.

Although arbitrary attributes may be defined, some conventions for attributes used in each entity type have been developed. These conventions are represented in Table II. These conventions are intended to be neither exhaustive nor limiting.

TABLE II

| Entity Type | Required Attributes | Description |
|---|---|---|
| All Activities | Environment | execution environment(s) for which activity is compatible |

TABLE II-continued

| Entity Type | Required Attributes | Description |
|---|---|---|
| Activities associated to source module components | Language | source programming language of module |
| | Executable | name of executable where module is to be integrated |
| Activities associated with executable program components | ExePath | pathname of executable program |
| Activities associated with DDE server components | Service | Server DDE service name |
| | Topic | Server DDE topic name |
| Activities associated with graphical user interface function components | guiKeys | Format string of activation key sequence |
| | guiWindow | Name of window where activation key sequence should be sent |
| All atomic ports | MapsTo | pointer to interface element corresponding to port |
| | Resource | type of data flowing through port |

All entities inherit not only the decomposition but also all attributes from their specialization parents. In addition, language elements also inherit all attributes defined at their decomposition parents. These features enable attributes that are shared by all members of a composite element to be defined only once at the decomposition parent level. For example, in FIG. 6, the pipe transfer activity 170 has several activities and dependencies contained therein. If this activity had the attribute definition, "Environment=UNIX," denoting compatibility with the UNIX environment, all of the activities 172, 174 and 176, and all of the dependencies 178, 180, 182, 184 and 186 also inherit this attribute. Since ports owned by an element are considered to be parts of its decomposition, ports always inherit all attributes defined at their owner.

In addition to normal values, attributes can be assigned to attribute variables. Attribute variables are strings that begin with "?". For example, the attribute Resource can be assigned the attribute variable "?res". Attribute variables need not be declared. They are automatically created the first time they are referenced. Unique variables are special attribute variables whose names begin with the string "?unq," e.g., ?unq-var, ?unq1, etc. They have the special requirement that their values cannot be equal to the value of any other variable in the same scope. They are used to express inequality constraints, as discussed in more detail below.

Attribute variables also are local to each owner entity, whether activity, dependency or resource, but are shared among an owner entity and all its ports. For example, all references to a variable at different ports of an activity refer to the same variable. Setting the variable at one of the ports affects both attribute definitions. Likewise, all references to a variable with the same variable name but at ports of second different activity refer to the same variable, only within the second activity. References across activities refer to different variables. For example, setting the variable at the first activity does not affect the value of a variable with the same name at the second activity.

Wires

The last entity of this architectural description language is called herein "wires," which are drawn as simple line segments to indicate that a legal connection has been established between a port of an activity and a port of a dependency. A wire also may be called a connector, but should not be confused with software connectors, relating to dependencies. Every time a new connection is attempted, the system performs a compatibility check, based on unification of corresponding attribute values at the two ends of the connection. Accordingly, establishment of a wire between composite ports implies that a set of legal connections between each of the corresponding subports has been made.

There are two types of wires in this system, internal wires and external wires. Internal wires connect free ports of decomposition or coordination process elements to compatible ports of their associated composite elements. For example, in FIG. 4, two internal wires connect the two free ports of atomic activity Retrieve Filename 96 to compatible ports of composite activity Retrieve Filenames 74. Establishment of an legal internal wire requires the decomposition or coordination process port, i.e., the internal port, to be equal to or a specialization of the composite element port, i.e., the external port to which it is being connected.

External wires connect activity ports to dependency ports. An activity port cannot be connected directly to another activity port. Similarly, a dependency port cannot be connected directly to another dependency port. Furthermore, the port at the activity side must be equal to or a specialization of the port at the dependency side. This restriction reflects the coordination perspective on software architecture adopted by this architectural description language, whereby software systems are represented as sets of activities interconnected through explicitly represented relationships. These restrictions on wires define the constraints that determine whether elements are compatible, and whether they can be connected by a designer who is generating an architectural description of a particular program.

Entity Specialization

Having now described the entities represented by this architectural description language, a property of inheritance used to implementation this language will now be described in more detail. Object-oriented languages provide the mechanism of inheritance to facilitate the incremental generation of new objects as specializations of existing ones, and also to help organize and relate similar object classes. An analogous mechanism may be used in the present invention to provide what is called herein, entity specialization. Entity specialization applies to all the elements of the language, and allows new activities, dependencies, ports and resources to be created as special cases of existing ones. Specialized entities inherit the decomposition and other attributes of their parents. They can differentiate themselves from their specialization parents by modifying their structure and attributes using editing operations described below. Entity specialization is based on the mechanism of process specialization described in Publication WO94/19742.

The mechanism of entity specialization enables the creation of specialization hierarchies for activities, dependencies, ports, resources and coordination processes. Such hierarchies are analogous to the class hierarchies of object-oriented systems. In specialization hierarchies, generic designs form the roots of specialization trees, consisting of increasingly specialized, but related designs. The leaves of specialization trees usually represent design elements that are specific enough to be translated into executable code. Specialization hierarchies have proven to be an excellent way to structure repositories of increasingly specialized design elements, such as a vocabulary of common dependency types, described in more detail below.

Apart from enabling the organization of related design elements into concise hierarchies, entity specialization also encourages application development by incremental refinement of generic application architectures. Designers can initially specify their applications using generic activities and dependencies. Such generic application architectures can then be iteratively refined by replacing their generic elements with increasingly specialized versions, until all elements of the architecture are executable. The existence of repositories of increasingly specialized design elements can reduce the specialization steps to a routine selection of appropriate repository elements.

Accordingly, in a way analogous to object-oriented class creation, entities in this architectural description language are created as specializations of other elements. New elements inherit the decomposition, coordination process, and all other attributes defined in their specialization parent. They can differentiate themselves from their parents by applying any number of the following transformations to their attributes, including either adding or deleting a decomposition or coordination process element, replacing a decomposition or coordination process element with one of its specializations, adding or deleting a connection, adding or deleting an attribute or modifying the value of an attribute.

Figure 9:
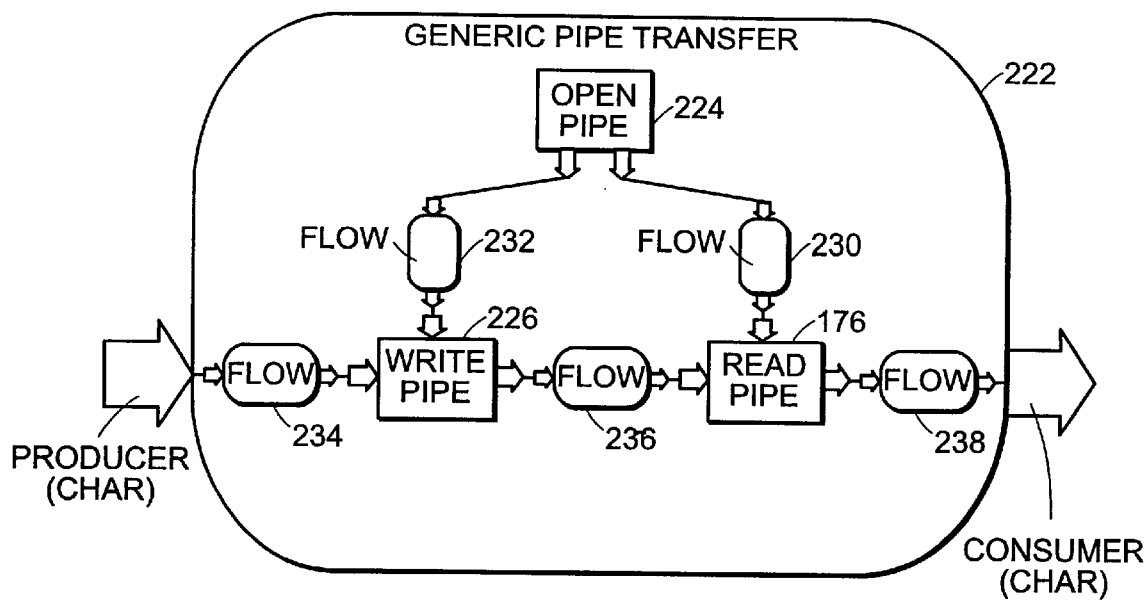
FIG. 9 is a diagram illustrating a generic pipe transfer dependency and its decomposition.
Figure 20:
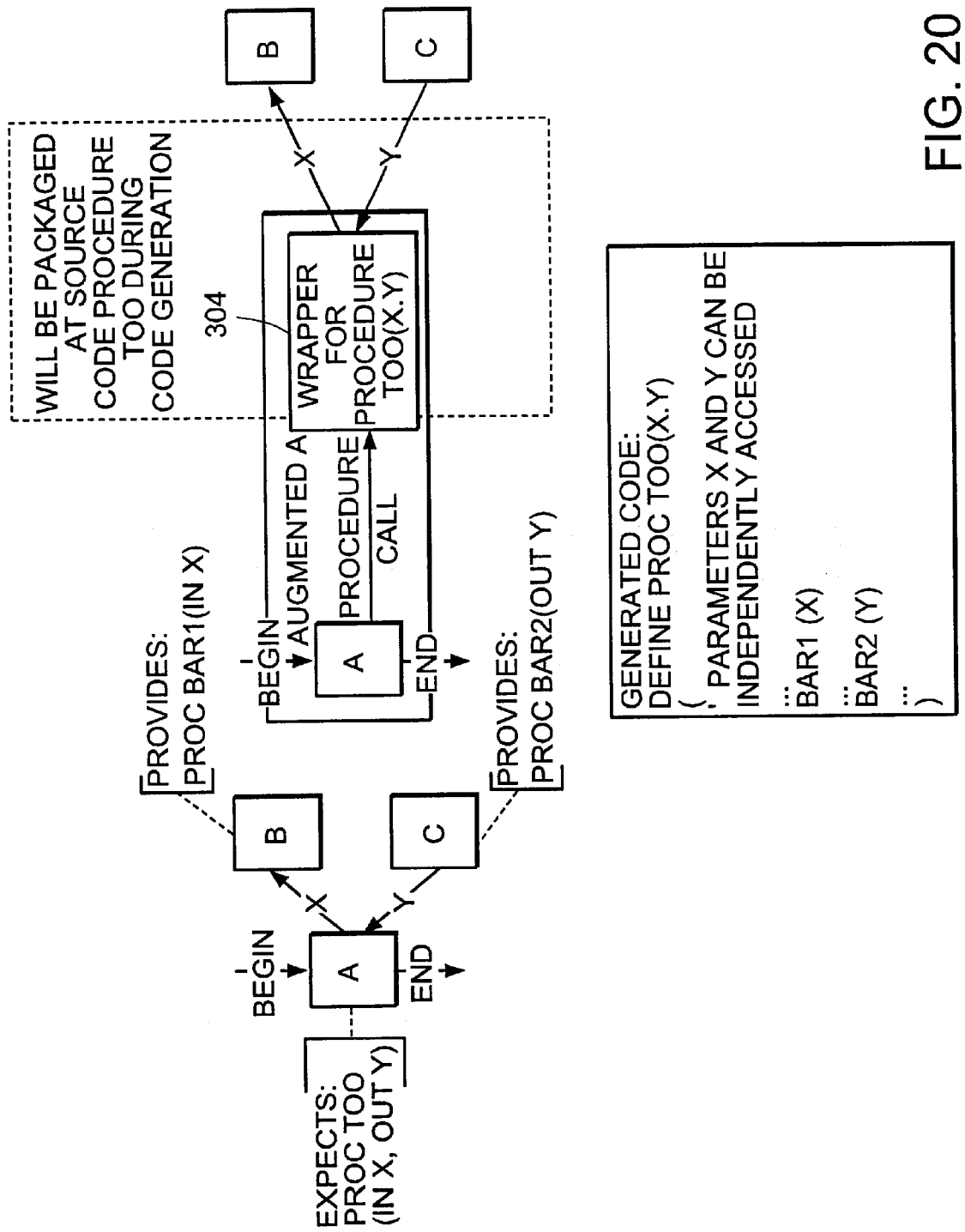
FIG. 20 illustrates an augmented activity having a procedure wrapper.

FIGS. 9 and 6 illustrate an example of how an executable dependency can be defined as a special case of a generic one by inheriting the coordination process of its parent and then replacing all generic activities and dependencies contained therein with executable specializations. FIG. 9 depicts a generic coordination process 222 for managing flow dependencies using pipes. The process describes the essence of a pipe protocol independently of the particular system calls that are used to implement it in a given environment. It is generic because it contains three generic activities 224, 226, 228 and five unmanaged dependencies 230, 232, 234, 236 and 238. FIG. 6, described above, depicts an executable specialization of the pipe transfer protocol, specific for the UNIX operating system. The specialization 170 inherited the design elements of the original protocol and replaced generic activities and unmanaged dependencies with executable specializations, appropriate for the UNIX operating system.

Specializing activities allows incremental refinement of architectural diagrams. Designers can specify architectures in very generic terms and then incrementally specialize their elements until an executable design has been reached. Such a process is supported by the ability to maintain hierarchies of increasingly specialized activities, encoding families of alternative designs for specific parts of software architectures.

From a linguistic perspective, specialization and decomposition impose constraints to ensure compatibility of ports between decomposed or specialized entities are the entities to which their parents connect an activity can be replaced with a specialization only if the new specialization is able both to replace structurally the original activity and to connect legally to all neighbor elements connected to it. If the specialization is composite, the same requirements apply for its decomposition as well. The requirements translate into two port compatibility requirements. First, for each connected port of the original activity, there must be an equivalent port of the specialization. Second, each port of the specialization must be compatible with the dependency port to which the corresponding port of the original activity was connected. These port compatibility requirements are enforced in the process of editing such representations, to be described in more detail below.

Dependencies also may be specialized. In order to derive executable implementations from such abstract descriptions, designers can follow two alternative paths. First, if a generic dependency has a decomposition, all elements of the decomposition can be replaced with executable specializations. Alternatively, a generic dependency may be replaced with a managed specialization. Managed dependencies are associated with coordination processes, which represent interaction protocols.

From a linguistic perspective, a dependency can be replaced with a specialization only if the new specialization is able to structurally replace the original dependency and legally connect to all neighbor elements connected to it. If the specialization is managed, the same requirements apply for its coordination process as well. The requirements translate into two port compatibility requirements similar to the ones for specializing activities. First, for each connected port of the original dependency, there must be an equivalent port of the specialization. Second, for each port of the specialization must be compatible with the activity port to which the corresponding port of the original dependency was connected.

Entities inherit attributes from their specialization parents. In addition, entities may "inherit" attributes from their decomposition parent as well. This features allows an attribute which is shared by all entities of a process to be defined once at the top-level activity and then be automatically inherited by all members of the decomposition. For example, suppose we have an attribute 'Company Name'. In a model of a process performed entirely by a single entity, the 'Company Name' may be defined once at the parent level. All subactivities of the process automatically inherit that attribute. This capability not only saves the need to manually enter 'Company Name' into all subactivities, but also allows some generic activities to be included unchanged in the decomposition, without the need to create different specializations of them, one for each different decomposition context in which they might be used.

Dependencies optionally may have associated coordination processes. The association is simply encoded by defining an attribute 'Coordination Process' at all dependencies and setting that attribute to point to the associated coordination process. Coordination processes must be able to structurally replace their associated dependencies in a given model. Therefore, coordination processes must be port compatible with their associated dependencies. In other words, for every port of a dependency, there must be a port of the coordination process which is equal to or a specialization of the corresponding dependency port.

One way to ensure port compatibility of coordination processes is by implementing the coordination process as a set of two siblings. One sibling is defined directly under the associated dependency and the other sibling is defined as an activity. The dependency sibling inherits the port structure of the associated dependency, while the activity sibling contains information about the patterns of activities and dependencies that form the decomposition of the coordination process. The connections between decomposition elements of the coordination process and the external ports of the coordination process are also stored in the dependency sibling. In that way, the system ensures that coordination processes are port compatible with their associated dependencies, because, in a way, they are defined as specializations of a dependency entity. The separation of information about decomposition and external port structure into two siblings also allows the same coordination process, i.e., the activity sibling, to be associated with several different dependencies. Coordination processes also may be implemented as a specialization of activities and can be provided with a separate port compatibility checking process that matches its ports with those of its included dependencies.

Implementation of Process Representation

Having now described the general entities of the language and the restrictions on their combinations, the representation of a process or software architecture in a computer system will now be described in connection with FIGS. 10 to 14.

Entities may be represented using many kinds of data structures in a computer program. In the following description we provide equivalent representations of the structures as objects or as relational database tables. Entities may be represented as classes in an object-oriented database or development environment. One development environment is KAPPA-PC development tool, from Intellicorp, Inc., but any other object-oriented system or database which provides the ability to define new subclasses dynamically at run-time can be used. Using the KAPPA-PC development tool, specialization is simply implemented using the properties of object-oriented inheritance. Specialization children are defined as subclasses of existing classes, and thus they automatically inherit all slots which are present in their parent. Multiple inheritance is supported by storing entities with multiple parents as a set of sibling classes. A different sibling class is defined under each specialization parent. Each sibling inherits all slots from its respective parent. Appropriate software coordinates the handling of siblings and combines decomposition and attribute elements inherited by each sibling.

Entities also may be represented using relational database schema. In the following description, the data structures may be implemented using relational database tables, where the fields in a particular structure are records in a table defined by the illustrated structure. In this implementation, of course, inheritance is implemented by appropriate software that provides similar functionality as the object-oriented development system. The following description does not give an exhaustive list of records for each table, or slots for each object, but only lists the relevant fields that convey the essentials of the implementation.

The primary kinds of entity, i.e., activities, dependencies, ports, and resources are all defined as specializations of the class PHObject 110, such as shown in FIG. 10. In relational table notation the equivalent representation would be records of a table PHObject. This object includes slots for a unique identifier 112, a name 114, a type or kind 116 (indicating whether the entity is an activity, dependency, port or resource), and any other attributes of the entity, such as its creator 118.

These four entity kinds share the following properties: they have a name, they are defined as a specialization of one or more entities, and they inherit a decomposition and attributes from a specialization parent. Differences among entity kinds are captured in semantic rules that specify what entities are allowed to be present in a decomposition, specific attributes that are always present in certain entity kinds, etc. It is also possible to provide another type of entity in the representation, called a "bundle," to group together related specializations of a given parent entity. Bundles are used in a Process Handbook representation to control automatic inheritance of properties by specializations of a parent entity. This representation makes it easy to add yet other entity kinds, e.g., actors, which may actually perform a particular activity, or send or receive, information etc.

Specialization is represented by a parent object or table 120 as shown in FIG. 11, since entities may have multiple specialization parents. In a relational table the parent of a given object, indicated by object identifier 122 is related to the identifier 124 of its specialization parent. For a given object, this table includes one record for each parent entity.

An entity also may have a decomposition, which is defined as a set of decomposition slots. A decomposition slot may be, for example, a pointer to an entity contained in the decomposition. Alternatively, a decomposition slot may be a pointer to a connector entity, which is a secondary entity that represents connections among primary entities present in the decomposition. In other words, a decomposition generally indicates a list of other entities and a list of connections among those entities. The rules for what kinds of entities and what kinds of connections are allowed in a decomposition depend on the entity kind as discussed above. In addition, all entities can have an arbitrary number of attributes. Decomposition slots may be stored as part of the entity class in an object-oriented system. In a relational table implementation, decomposition slots may be stored in a separate table. A table 130 for a decomposition is shown in FIG. 12. This table includes an indicator 132 of the decomposition "parent" object, or the entity for which the decomposition is defined. In addition a "decomposition slot" 134 of an object has its own unique slot identifier which is separate of both the identifier of its owner (the decomposition parent), and the identifier of the decomposition element itself. A slot value 136 stores the unique identifier for the object that fills the decomposition slot 134. The kind value 138 stores an indication of whether the owner of this decomposition is an entity or a connector. Other information may be stored as indicated at 140 about how to display the decomposition, etc.

A slot identifier is used to handle, for example, the case where an activity A contains two subactivities B and C in its decomposition. The decomposition thus contains two "slots", e.g., S1 and S2, which are "filled" with activities B and C respectively. If an activity A' is defined as a specialization of activity A, new activity A' inherits all decomposition slots and their values from activity A. In activity A', however subactivity B is replaced with subactivity B'. By using a separate "slot" id, the replacement is made by modifying the slot value for slot S1 from the identifier for subactivity B to the identifier for subactivity B'. In addition to allowing simple replacements, this scheme also permits the system to represent the fact that B' is a replacement of a previously inherited element.

Another structure called a connector, corresponding to the wire entity, is used to connect elements together. Connectors are displayed as lines linking ports of one entity to ports of another entity. As shown in FIG. 13, each connector 142 has a connector identifier 144. The connector identifier is stored in the decomposition slot of the most recent common ancestor of the two elements that are being connected. The identifier of the most recent common ancestor of the two endpoints of the connection is stored in the owner identifier slot 146. The first endpoint slot 148 includes the path of the first endpoint, i.e., a list of slot identifiers of successive elements hat have to be traversed in order to reach the endpoint. The second endpoint slot 150 includes the path of the second endpoint. In a relational database lists can be stored as strings which contain a concatenation of the list elements.

Basing connectors on lists of slot identifiers, as opposed to lists of successive decomposition object identifiers, has the following advantages. First, the sequence of slot identifiers is traversed to reach a particular endpoint which allows connectors between different instances of the same entity to be defined unambiguously. Second, connectors may be inherited from a parent and remain unaltered after one of more connected activities are replaced by some of their specializations in the child. In other words, specializations may be modified without worrying about connectors.

Attributes of an entity also may be represented as additional fields of the entity, and may have arbitrary attributes. Attributes have a name, a type, a value, and possibly links to additional information. Example attribute types include scalar values, e.g., numeric, boolean or string, pointers to other Synthesis objects, pointers to system objects, e.g., files or OLE objects, and lists. Attributes optionally may be given a variable as a value. Variables are used to check port compatibility when establishing connections or when replacing entities with specializations, as will be described in more detail below.

Having now described an architectural description language in accordance with the invention, and one implementation of a representation of architectural descriptions, various systems for using this process representation will now be described.

There are various user-interface clients that can be provided to read the process descriptions stored in the process repository to generate appropriate displays to users as illustrated above in connection with FIG. 2. Such a system, for example, is described in the PCT Publication WO94/19742. That system could be modified to include the representations of ports and resources as described herein. Its navigational aids may assist in the comparison of alternative designs for implementing activities and their coordination processes.

Another particularly useful tool is an editor 42 which allows a user to graphically input representations of a software system. Such a system may be provided using several kinds of interfaces, but may use a graphical system such as VISIO, a commercial application for drawing charts and diagrams from Shapeware Corporation. VISIO can act as a graphic server for other applications through a windows protocol called OLE Automation which allows an application to act as a globally accessible application offering a set of methods to other applications. The implementation of a suitable user interface and the provision of editing functions and entity specialization may be performed using systems such as shown in the PCT Publication WO94/19742 and in the U.S. Provisional Application Serial No. 60/013,694 which is incorporated by reference.

Checking Element Compatibility

In the editor for this system, when a dependency is connected to an activity a compatibility check is done between the ports of the activity and the ports of the dependency. Such a connection occurs when a new activity or dependency is added to the representation, or when an activity or dependency is modified or replaced. This process will now be described briefly.

As discussed above, there are several semantic restrictions and constraints on the ability of entities to interconnect. Some of these restrictions are encoded in the syntax of the language. For example, activity ports can be connected only to dependency ports. Furthermore, dependency ports can be connected only to activity ports that are equal to or a specialization of them.

Other restrictions are specific to the attributes of code-level elements, i.e., components and connectors, associated with executable activities and dependencies. One such restriction is that an activity associated with a source code procedure returning an integer value can only be connected to other activities through dependencies associated with coordination processes capable of transporting integer values. Another such restriction is that flow dependencies managed by local variable connectors can only connect activities whose associated components can be packaged inside the same sequential code block. Similarly, flow dependencies managed by, for example, a DDE transfer coordination process, can connect only with activities whose associated components are packaged in different executables within the same Microsoft Windows-based host.

These restrictions and constraints are encoded so that a number of compatibility tests can be performed automatically by the language. Hence, a problem similar to type checking in a programming language arises whenever two elements are connected together. Since all connections are between ports, it is desirable to be able to perform compatibility checks at the port level, and when a wire is to be established between two ports.

Compatibility checking may be based on attributes which specify the compatibility restrictions. Before establishing a connection between two ports, a port matching algorithm that determines port compatibility is performed, as will now be described in more detail in connection with FIGS. 15–17. In this process, the values of all attributes that exist at both sides of the attempted connection are compared. If both attributes have a fixed value then the two values must match. If either attribute is assigned to a variable, a process similar to unification takes place. If at least one attribute fails to match, the connection is considered illegal.

The semantics and scope rules of attributes and variables discussed above permit a number of compatibility constraints to be encoded into attributes. For example, if an attribute must have a specific value at all neighbor elements, the attribute may be defined with the specified value at all ports where this condition is required. If the condition is required at all ports of an owner element, the attribute need only be defined once at the owner element. For example, a dependency managed by a coordination process encoding a UNIX pipe protocol can be used only to connect components that will run in UNIX environments. Designers can encode this constraint by defining an attribute Environment set to UNIX at the top level of the process. This attribute is inherited by all ports. In order to pass the compatibility check, all connected activities must contain the attribute set to the same value.

As another example, if an attribute must have the same unspecified value at all neighbor elements, the attribute may be set to the same variable name at all ports where this condition is required. The unification process will only succeed if the equivalent attribute at the other end of all connections has the same value. For example, local variable transfer is the simplest coordination process for managing flow dependencies. However, it can only be used if all its members both produce and use the same data type, and can be packaged into the same procedure. The latter requirement implies that they also have to be written in the same language and be packaged into the same executable program. For example, as shown in FIG. 15, these constraints can be encoded into the attributes 270–273 of the ports 274 and 276 of the associated dependency 278.

As another example, if an attribute must have a different value at each neighbor element, the attribute may be set to a different unique variable at each port where this condition is required. Since each unique variable cannot be unified to a value given to any other variable, unification will only succeed if the attribute has a different value at each neighbor element. For example, Dynamic Data Exchange (DDE) is one protocol for transferring data among different executable programs in the Microsoft Windows operating system. It does not work properly for transferring data within the same executable. Thus, it can only connect components that will be integrated into different executables. For example, as shown in FIG. 16, this constraint can be encoded into attributes 280, 282 of the ports 284, 286 of the associated dependency 288.

Attribute unification simultaneously checks constraint compliance and creates equivalence classes of attribute values across a number of elements. For example, an attempt to connect two activities through a dependency managed by a local variable transfer coordination process (FIG. 15), both checks whether the two endpoint activities can be packaged together into the same procedure, and unifies attribute Procedure at both of them to the same equivalence class. Attribute unification is therefore one of the mechanisms used by the system in order to integrate activities and dependencies into sets of executable modules. This aspect of the system will be described in more detail below.

The process of checking compatibility of activity and dependency ports is illustrated in more detail in FIG. 17. In this process, if the ports are not of identical type, i.e., both composite or both atomic, then the compatibility check fails, as indicated at step 460. If both ports are composite, then the subports are recursively matched in step 462. Next, if both ports are atomic as determined in step 464, then the activity port is compared to the dependency port. If both Aports are the same or if the activity port is a specialization of the dependency port, then the attributes at both ports are compared. Otherwise a failure in the compatibility check is indicated at 466.

The comparison of the attributes is performed by calling a Match Value function when both ends have a value as indicated at 468. If one end has a value and the other end refers to a variable and if this variable has a value, then the Match Value function 468 is also called. If one end refers to a variable and the variable does not have a value, both this variable and its equivalents class are set to the value at the other end of the matching port in step 472 and success is indicated as in step 470. If both ends refer to variables and if one or both variables has a value, then the steps, as indicated at 472, are again performed. If no variable has a value then the process proceeds with step 474 of unifying both variables into an equivalence class and returning success.

The Match Values procedure takes the value of an attribute at the activity side and a value of an attribute at the dependency side and returns success when the values match and failure otherwise. In particular, if the values are pointers to language elements and if the attribute at the activity side is a specialization of the attribute at the dependency side, success is returned as indicated at 476.

Constructing Representations of Software Architectures

Given the linguistic support for defining and checking architectural diagrams, described above, and design support for leveraging the construction of correct diagrams, application architectures may be easily constructed using an editor. In particular, the architectural description language described above supports a set of graphical abstractions as shown in FIG. 4 for defining activities and dependencies, as well as the linguistic means to interconnect them, namely ports and connectors. Furthermore, it supports a compatibility checking mechanism that is able to detect a number of inconsistencies when connecting elements together.

Apart from linguistic support for specifying activities and dependencies, the construction of application architecture diagrams can be facilitated by assistance on how to decompose an application to simpler functional pieces, and assistance on how to represent interdependencies among application functional pieces.

Application decomposition can be facilitated by the reuse of generic decompositions for frequently occurring problems. This requires the creation of process repositories, or process handbooks, for storing, searching, and reusing architectural design fragments. The architectural description language provides a number of mechanisms for supporting the construction of process repositories. Architectural patterns can be expressed as composite activities. Through the mechanism of entity specialization, sets of related composite activities can be organized and stored in a specialization hierarchy. Specialization hierarchies are similar to class hierarchies in object-oriented system, and can be used as the basis for structuring repositories of reusable architectural patterns.

The problem of specifying interdependency patterns among application activities can be similarly facilitated by a repository of dependency types for frequently occurring patterns of interaction. Because interconnection relationships can be described using a relatively narrow set of concepts, orthogonal to the problem domain of most applications, a standardized, but extensible, vocabulary of dependency types, can be used by designers to express the interaction requirements in their applications. The specialization mechanism of the architectural description language can be used to store and structure the vocabulary of dependencies. Such a repository may be considered as a design handbook of representations of coordination processes for managing dependencies of a variety of types. The design handbook may be used to review several instances of different types of coordination processes for managing types of dependencies.

Implementation of an example entity repository is described in more detail below. The entity repository may have a browser allowing for tree-like views into the hierarchies of the defined coordination processes. The browser may be implemented following the teachings of PCT Publication No. 94/19742. An implementation of a design handbook of coordination processes will now be described.

Repository of Coordination Processes

In the design handbook, the different kinds of dependencies in software systems define a design space which maps each type of dependency to a family of alternative coordination processes for managing it. A particular coordination process is selected from that family by specifying the values of a relatively small number of additional parameters called design dimensions. For example, a coordination process for managing a data flow dependency can be selected by specifying the type of carrier resource, e.g., shared memory, file, or pipe, and the paradigm, e.g., push, pull, peer or hierarchy, for managing the embedded prerequisite. Some of the alternatives can be automatically ruled out by compatibility constraints. For example, when designing a data flow between two components running under UNIX, only data transport mechanisms supported by UNIX can be considered as alternatives. This reduces the selection of a coordination process to a routine selection of a relatively small number of design parameters.

Figure 31:
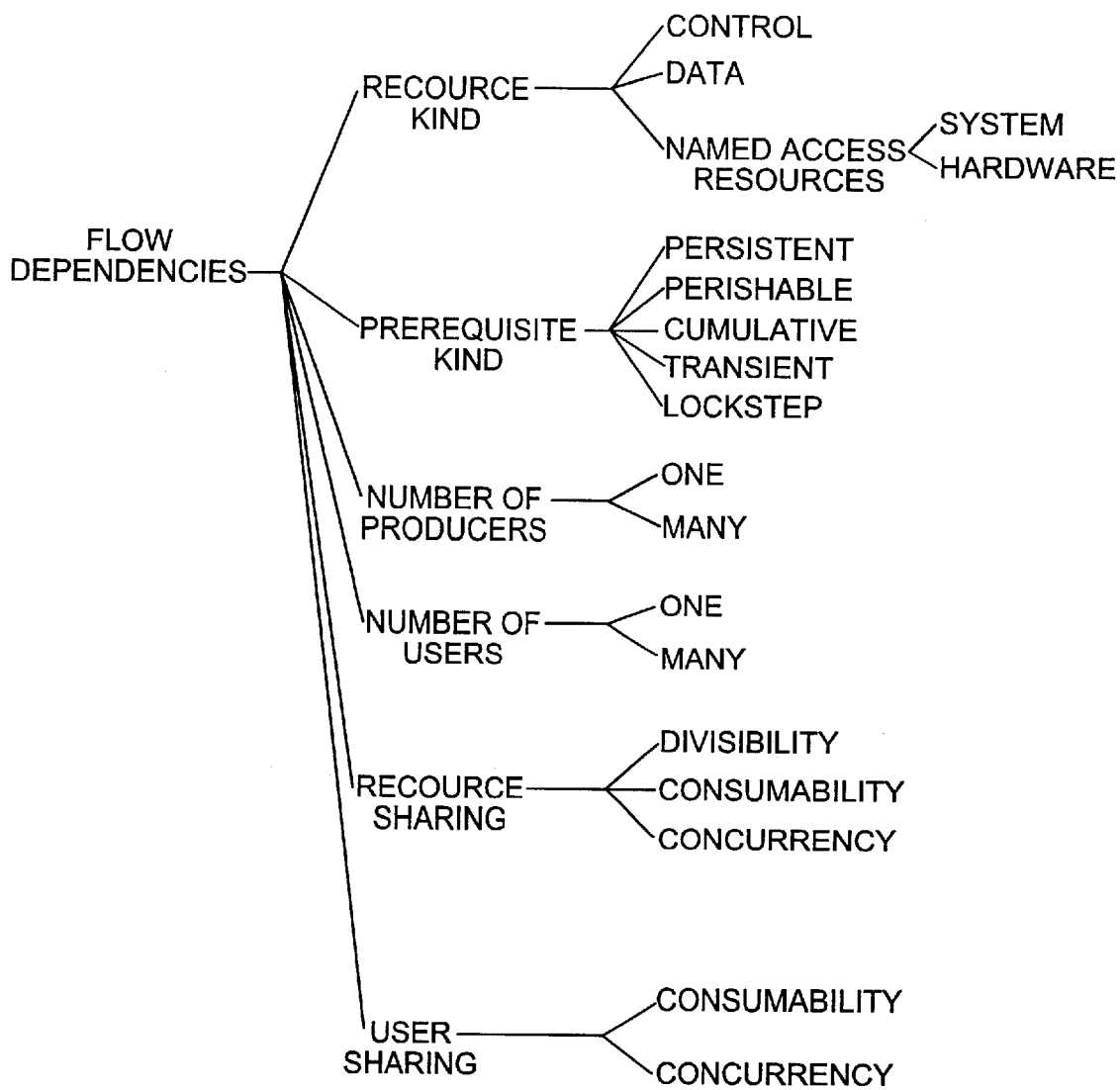
FIG. 31 is a diagram of a set of design dimensions of flow dependencies.
Figure 32:
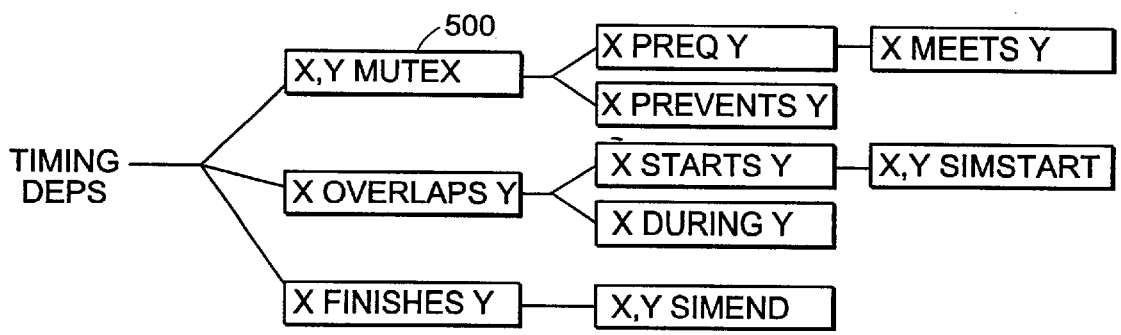
FIG. 32 is a diagram of a specialization hierarchy of timing dependencies.

Generally speaking, the design handbook correlates a vocabulary of dependency types into a design space of coordination processes. Dependencies generally encode the need of an activity to interact with other activities, either because they use resources produced by other activities, or because they share resources with other activities. As a result, there generally are flow dependencies between producers and consumers, resource sharing dependencies among consumers of the same resource and timing dependencies which specify constraints on the relative timing of two or more activities. FIG. 31 illustrates levels of design dimensions for flow dependencies. Each of these design dimensions defines a way in which a particular dependency may be specialized. Similarly, there are a small number of timing dependency specializations which are also illustrated in FIG. 32. The design dimensions of flow dependencies will first be described in connection with FIG. 31.

The design dimensions represented in FIG. 31 also may be used to define bundles of alternative specializations within a particular category. With this kind of construction of the repository, all specializations of a particular bundle may inherit specializations in other bundles automatically. For example, all specializations under the single user flow dependency may inherit as further specializations all flow dependencies which are specializations on the number of producers.

Specialization of flow dependencies based on resource kind translates into types of useability dependencies. These dependencies represent the simple fact that resource user should be able to properly use produced resources. Similarly, accessibility dependencies specify that a resource must be accessible to a user before it can be used. Such accessibility dependencies may be represented as resource kind dependencies or prerequisite dependencies, or as sharing dependencies.

Prerequisite kinds of dependencies specify that a resource must be produced before it can be used. As indicated in FIG. 31, persistent prerequisites are one kind of prerequisite that specify that a single occurrence of an activity is an adequate prerequisite for an infinite number of occurrences of a second activity. An example is system initialization. Perishable prerequisites are special cases of permanent prerequisites, but occurrence of a third activity invalidates the effect of the first activity, which then must be repeated. Cumulative prerequisites permit occurrence of two activities to be interleaved so long as the number of occurrences of the second activity is always smaller than or equal to the number of completed occurrences of the first activity. This prerequisite often arises in asynchronous resource flows with buffering. Transient prerequisites specify that at least one new occurrence of a first activity must precede each new occurrence of a second activity. Lock step prerequisites specify that exactly one occurrence of a first activity must precede each occurrence of the second activity. They often occur in resource flows without buffering and are a special case of transient prerequisites.

Sharing dependencies arise when more than one activity requires access to the same resource. Sharing dependencies arise in different variations on the number of producers, number of users, and whether it involves resource sharing or consumer sharing. Resource sharing considerations arise in one-to-many flow dependencies because more than one activity uses the same resource. Consumer sharing dependencies arise in many-to-one flow dependencies because more than one producer produces for the same consumer activity. Sharing resources may have coordination requirements depending on the divisibility, consumability, or concurrency capabilities of the resource. Several example processes for managing these various types of dependencies are illustrated in U.S. Provisional Application Serial No. 60/013,694, filed Mar. 19, 1996.

Considering timing dependencies shown in FIG. 32, timing dependencies refer to relationships of two time intervals, shown as X and Y in FIG. 32. Timing dependencies are generally categorized into three types. First, mutual exclusion dependencies limit the total number of the set that can be executing at any one time. Such dependencies typically arise among competing users who share resources with limited concurrency. There are two types of mutual exclusion dependencies, namely prerequisite dependencies and prevention dependencies. Prerequisite dependencies specify that a first activity must complete execution before a second activity begins execution. These prerequisites arise in two general situations, described above, between producers and consumers of a resource. Prerequisites are a special way of managing mutual exclusion dependencies. Prevention dependencies specify that the occurrence of a first activity prevents further occurrences of a second activity. Such prevention may be permanent or temporary. These relationships are closely related to perishable prerequisite dependencies. One specialization of the prerequisite dependency specifies that a first activity should begin execution after completion of a second activity. This specialization imposes a minimum or maximum delay between completion of the first activity and the initiation of the second activity. This is similar to a lock step prerequisite. This dependency is useful in situations where resources produced a finite lifetimes and must be used within a specified time interval.

Another category of timing dependency is the overlap dependency which specifies that a first activity can only begin execution after a second activity is already in process. Such relationships typically imply resource relationships between the first and second activities. One subcategory of this kinds of dependency is the "during" dependency which specifies that a first activity can only execute during this execution of a second activity. As an example, a network client can only execute successfully during execution of the system's network driver. A starts dependency specifies that a first activity must start execution whenever a second activity starts execution. As an example, a printer driver is often initialized at the same time a word processor program is started. A particular form of this dependency is the simultaneity which specifies that all activities in a set must start execution at the same time. These dependencies can be transformed into many-to-many prerequisite dependencies and managed as such.

Another kind of timing dependency is a finishes dependency which specifies that the completion of a first activity also causes a second activity to terminate. This dependency is most often used to specify application termination relationships. A particular specialization of this dependency is the simultaneous end dependency which specifies that all activities in a set must terminate if any of them completes execution. As can be seen, many of these timing dependencies can be represented by prerequisite flow dependencies, and can be managed as such.

More complex composite dependencies can be represented to indicate arbitrary static flow patterns, multiple unit directional flows, exchange dependencies, circular flows, etc. Each of these dependencies has corresponding coordination processes associated therewith. Each of the design dimensions specifies a different dependency type for which there may be several coordination processes. These coordination processes have characteristics which define coordination design dimensions within a particular dependency type. Each point in the coordination design space defines a different coordination process. There are many other ways to represent the design dimensions for coordination processes. Accordingly, the foregoing is neither exhaustive nor limiting of the present invention.

Automatic Generation of Executable Code from Software Architecture Descriptions

Given a description of a software system using the above-described architectural description language, executable program code may be generated by transforming a software architecture definition according to a process which will now be described in connection with FIGS. 18–30. Generally, in this process, given an application architecture diagram using the architectural description language described above, generic activities are iteratively specialized. Unmanaged dependencies also are managed iteratively. Executable design elements are then integrated into code modules. Each of these steps now will be described in more detail.

As discussed above, activities can be generic or executable, which enables designers to specify the architecture of their applications at any desired level of abstraction. However, in order for executable code to be generated, all generic activities must first be replaced by executable specializations. Executable atomic activities, or primitive activities, are associated with some code-level software component, such as a source code module, or an executable program. Composite executable activities decompose into sets of executable elements. Therefore, the step of replacing generic activities results in the eventual association of all activities in an architectural diagram with sets of code-level software components.

The responsibility for locating and selecting the most appropriate code-level components for a designer. There are some proposed technologies for collecting software components into component libraries, easily accessible to the community of designers. Furthermore, new technologies, such as the Internet, are making a growing number of software component repositories readily accessible to designers. Once a component is selected, it may be added to the representation by providing a component description for the selected component.

Nonetheless, component selection is facilitated because each activity can be associated to a software component independently of any other activity. Also, designers do not have to worry about the specific form of components and their interfaces. Handling of potential mismatches between component interfaces is completely contained in the coordination processes that manage dependencies among components. With the present invention, designers need only care about whether a given component contains the fiinctionality required by its associated activity and not about how it will fit together with other components already selected.

Similarly, in order to generate an executable system, generic dependencies must be replaced by executable specializations. Executable dependencies are either directly associated with a software connector, implementing a low-level interconnection mechanism, or with a coordination process, defmed as a pattern of simpler dependencies and activities. In order to specialize the dependencies, linguistic support is needed to provide adequate abstractions for defining dependencies and design support, such as a process repository, should be provided to assist designers in selecting a software connector or coordination process that manages a given dependency, as described above.

The architectural description language described above provides the linguistic support by representing coordination processes and software connectors as attributes of dependencies. Coordination processes provide a single location for specifying all the pieces of an interaction protocol. In contrast, traditional programming languages usually force the description of interaction protocols to be distributed among the interacting components. The design support provided for assisting the selection of coordination processes is the design space of coordination processes for each element of a vocabulary of dependencies, described above.

Most of the coordination processes in the design handbook are defined at the generic level. This means that they are defined as sets of lower-level generic activities and unmanaged dependencies. For example, the generic process for managing a one-to-one data flow dependency consists of two lower-level generic activities and a number of unmanaged flow dependencies. In order to integrate that process in an executable application, each of those generic decomposition elements has to be specialized in turn. Therefore, the previous candidate selection process has to be recursively applied to all decomposition elements as well. The design process completes when all activities and dependencies introduced are executable. Executable activities have associations with code-level software components. Executable dependencies are associated to code-level software connectors, directly supported by specific programming language or operating system mechanisms, e.g., C procedure calls or UNIX pipe protocols.

This design process can be greatly assisted, or even automated, by computer. Assuming that there is an on-line repository of increasingly specialized dependency types, a generic dependency defined in the architectural description of a system is managed as follows.

A design assistant automatically searches the repository of managed specializations of the generic dependency. It rules out dependencies whose associated coordination processes are rejected by the compatibility checking process described above in connection with FIG. 17. A designer is then prompted to select one of the dependencies that pass the compatibility test. Alternatively, the system can prompt the designer with a set of design dimensions to be specified. If the coordination process associated with the selected dependency decomposes into lower-level unmanaged dependencies or generic activities, the selection process is recursively applied to each of them. Instead of using recursion, a to-do list can be used to iteratively store encountered generic activities and unmanaged dependencies, and then retrieve and handle them until the list becomes empty.

The process of managing a dependency can be fully automated by allowing designers to specify evaluation functions, or constraints, that enable the computer to automatically rank candidate alternatives for each transformation. Such evaluation functions could be constraints on specific process attributes. For example, one conitraint may be that all coordination processes must adhere to client/ server organizations. Evaluation functions also may be related to the computational cost of coordination processes. Evaluation functions can further restrict the number of candidate coordination processes presented to designers. In some cases, they might restrict the candidates to one, in which case the selection process becomes fully automatic.

Since the process relies on the existence of a repository of coordination processes, there might be situations for which no compatible coordination process has been stored in the repository. For example, when managing a usability dependency which requires conversion of strings to integers in Visual Basic, there might be no such specialization of the conversion activity in the repository. In such cases, the system asks the users to define a new activity specialization with that functionality. The specialization typically does not require more than a few lines of code, and becomes a permanent part of the repository. In that manner, repositories of design elements can be incrementally extended and eventually become rich enough to be able to handle a large number of practical cases.

Such a process of selecting coordination processes relies on the assumption that every dependency can be managed independently of every other dependency, unless the designer has explicitly combined a number of dependencies into a composite dependency pattern. This assumption is equivalent to the assumption that the connections of an activity port to other parts of the application can be managed independently of the connections of every other port of the same activity. However, software components built with current technologies contain interface dependencies among their interface elements which, unless properly decoupled, would force connections of sets of activity ports to be jointly managed.

For example, FIG. 18 illustrates a fragment of an application architecture. Activities X, Y, and Z are associated with source code procedures. Activities V and W are associated with remote servers that can be called from source code using remote procedure calls (RPCs). Ideally, each of the four dependencies shown in the diagram would be managed independently of one another to allow a simple repository of one-to-one coordination processes to handle this example. However, the semantics of RPC interfaces place obstacles to this goal. RPC interfaces expect to receive all their input data and control at the same time, packaged inside a single RPC call. Moreover, they return all output values to the point of call through that same interface as well.

Managing dependencies independently of one another requires that their coordination processes do not share any code. Therefore, in FIG. 18, dependency Flow 1 should be able to communicate its value to activity V without relying on any code introduced by the management of any other dependency. Likewise, dependency Flow 2 should be able to access the result of invoking activity V independently of how Flow 1 has been managed. Finally, a prerequisite dependency should be able to ensure that activity Y occurs before activity V, independently of any code introduced by the management of either dependency Flow 1 or dependency Flow 2. Unfortunately, RPC semantics force coordination processes for all three dependencies to share a common step, i.e., the RPC call. Thus, management of the three dependencies typically has to be done jointly.

For similar reasons, in this example dependencies Flow 2 and Flow 3 must be jointly managed. Finally, all four dependencies in the diagram have to be treated jointly, in order to manage them properly. In addition to requiring additional mechanisms for automatically detecting such implementation-dependent "dependencies among dependencies," the existence of such dependencies could require explicit support for arbitrarily complex composite dependency patterns in a design handbook repository.

Such interface dependencies are related to the shortcomings of current-technology code-level components in separating interconnection assumptions from the implementation of a component's core functionality. They are intrinsic properties of the code-level components chosen to implement atomic activities. For that reason, they should be handled at a level orthogonal to that of managing dependencies among activities.

One way to handle interface dependencies is by introducing additional activities that attempt to decouple them. In other words, before attempting to manage any dependency, primitive activities are scanned and interface dependencies among their ports are detected. Whenever such dependencies are found, the original primitive activity is replaced with a composite augmented activity which includes activities for decoupling ports from one another, allowing them to be independently managed.

Interface dependencies may be detected because they are inherent properties of specific interface types. CDL definitions associated with every primitive activity contain information about the component's provided interfaces, as well as other interfaces expected by the component. Interface definitions involve a set of input and output data elements, e.g., "proc foo(in a:Integer, out b:String);". Each of those elements is mapped to a corresponding atomic port of the primitive activity. Interface elements are dependent on one another because they typically have to be combined together into a single interface call, e.g., a procedure call, or a single interface header, e.g., a procedure header.

One way to decouple interface dependencies is by transforming complex interfaces to and from sets of local variables. Each local variable stores one interface element. Since local variables can be independently read or written, this set of transformations enables each input resource to be independently produced and each output resource to be independently consumed.

The transformations require the introduction of two sets of mediator activities around primitive activities with interface dependencies, callers and wrappers. Callers are activities that read or write a set of independent local variables and construct a corresponding call to a given composite interface. Wrappers are activities that make a given composite interface available to the application, and demultiplex its elements into sets of independent local variables.

Using callers and wrappers, the process of decoupling interface dependencies among activity ports can be expressed as follows. Each primitive activity with interface dependencies is structurally replaced with an augmented activity which, in addition to the original activity, contains mediator activities including a caller activity for each interface provided by the component and a wrapper activity for each interface expected by the component. The caller activity connects to all ports originally associated with the provided interface of the component.

For example, as shown in FIG. 19, an original activity 290 has begin and end ports 291 and 292, respectively, and an input port 293 and an output port 294. According to its component description 295 it provides an interface of "x (in a, out b)". The activity is augmented by making a composite activity 296 of a caller activity 298 which implements the interface to activity A 290.

Since a caller activity connects to all ports originally associated with the provided interface of the component, it allows each dependency originally connected to the activity to independently read/write its associated resource to/from a local variable. The caller activity is then responsible for assembling all resources into the appropriate interface call.

In the same manner, wrapper activities connect to all ports originally associated with each expected interface. Wrapper activities define headers of composite interfaces called by other components. In addition, they store each element contained in those headers to independent local variables.

Callers and wrappers are specified per interface type. In fact, in order to support a new component kind, designers specify appropriate caller and wrapper activities for its associated interface type.

An example will demonstrate how callers and wrappers can be defined for a number of common interface types. If a component provides a source procedure interface, it can be invoked from inside other blocks of code by simple procedure calls. The default semantics of procedure calls enable them to receive their input parameters, and leave their output parameters to sets of independent variables. For example, in the C language call statement, "foo(a, b);", a and b are local variables that can be given values by independent statements preceding the call. As a consequence, provided procedure interfaces need not be augmented.

If a component expects a source procedure interface, this means that there is a call to a procedure, defined externally to the component, with the expected interface from within the code of the component. Therefore, a procedure definition with the expected name and parameter list must exist in the final application, and the code of this procedure must allow each element of its parameter list to be independently accessed by each activity connected to the corresponding atomic port of the calling component.

Such components are augmented by the introduction of procedure wrapper activities. Procedure wrappers translate to source code headers of procedure calls with the specified name and parameter list. Activities originally connected to the ports of an expected procedure interface, will be connected to the wrapper after augmentation takes place. For example, in FIG. 20, the component described at 300 and associated with activity A contains an internal call to procedure "foo". In the application diagram shown, the two parameters x and y passed to procedure foo by component A, must be independently accessed by components associated with activities B and C. During code generation, calls to the components associated with activities B and C are packaged inside the body of the procedure defined by the wrapper 302. Therefore, they are able to independently access each procedure call parameter through local variables, as indicated in the generated code 304.

Figure 21:
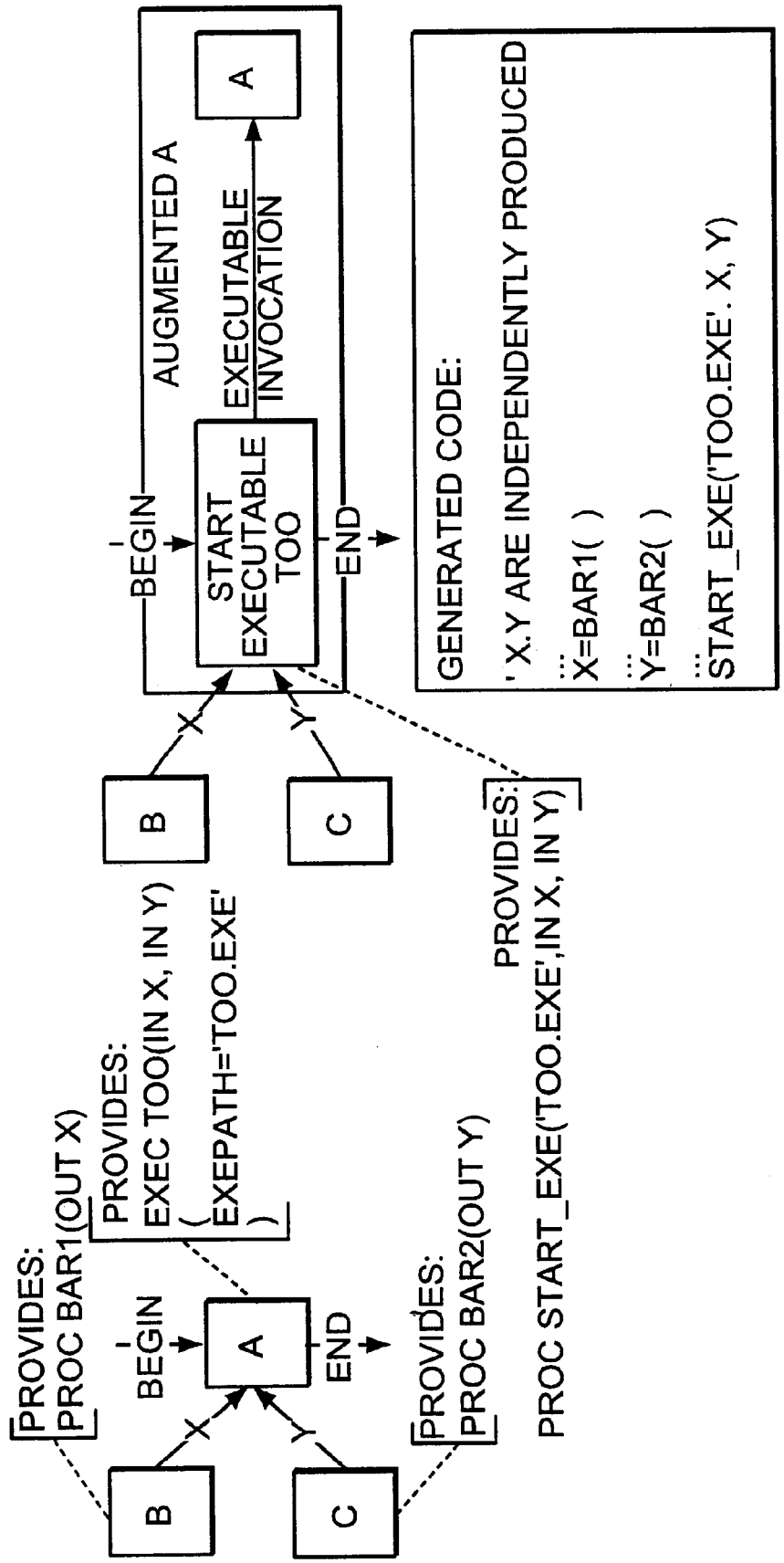
FIG. 21 illustrates the introduction of a executable caller into an activity.

As another example, components that provide executable program interfaces correspond to executable program files. Caller activities for executable components are source code procedures which independently receive all command line parameters necessary to invoke the executable and construct the appropriate operating system invocation call, as shown in FIG. 21.

Figure 22:
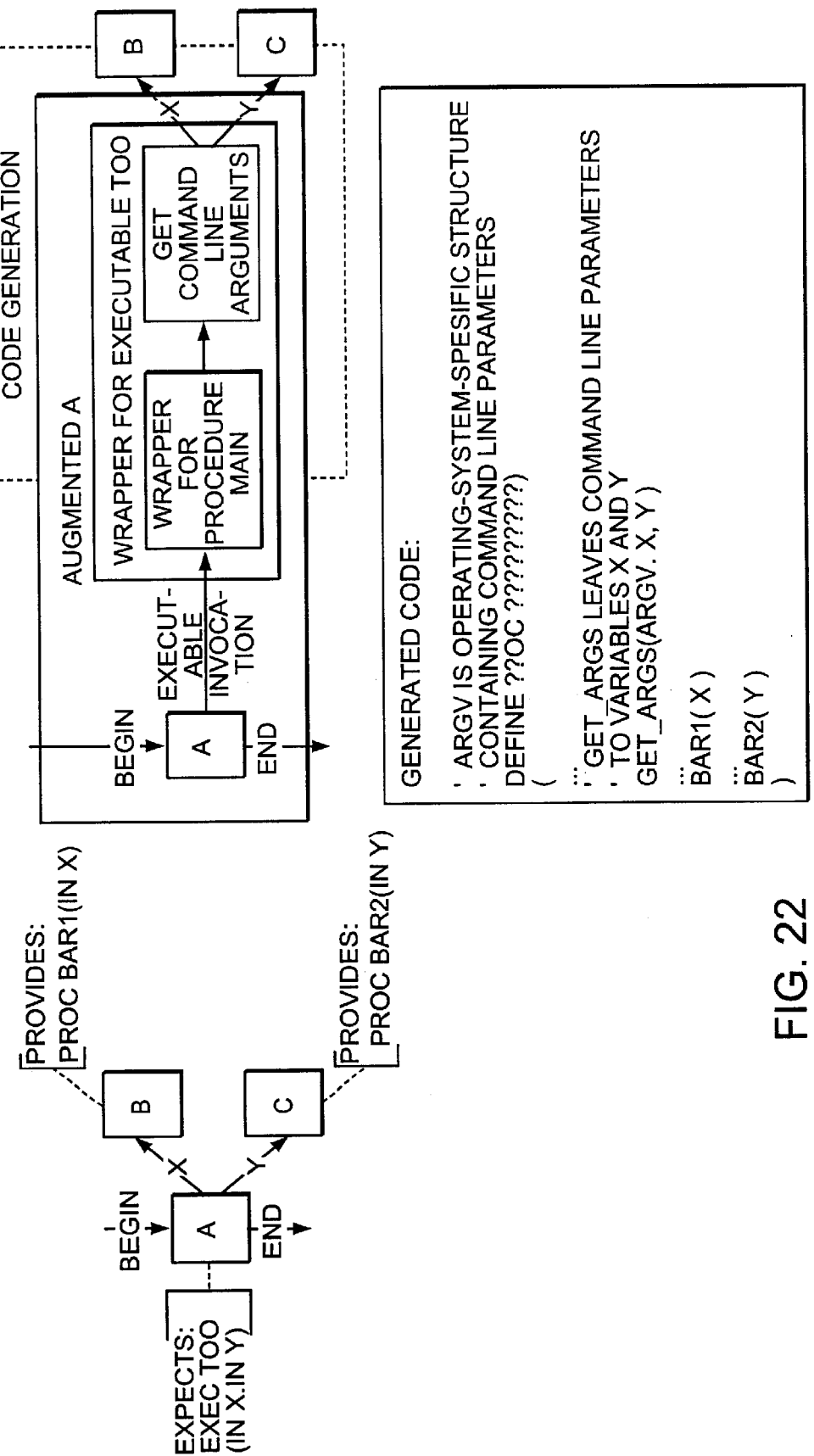
FIG. 22 illustrates the introduction of an executable wrapper in an activity.

If a component expects an executable program interface, this means that an executable program with the expected name and interface is invoked from within the code of the component. Such components are augmented by the introduction of executable wrapper activities. Executable wrapper activities translate to main procedure headers for executable programs with the expected name and parameter list. In addition, they introduce system-specific activities which read the command line argument structure passed to the main procedure by the operating system, and leave each passed argument to a different local variable. Activities originally connected to the ports of an expected executable interface, will be connected to the wrapper after augmentation takes place, as shown in FIG. 22. During code generation, those activities are packaged inside the body of the main procedure of the executable defined by the wrapper. Therefore, they are able to independently access each command line argument through local variables.

Finally, some programs designed for interactive use activate certain functions when users press a key sequence. For example, a text editor opens a file when users press CTRL-O, followed by the filename, followed by newline. In order to integrate such programs into larger applications, we view them as components that provide a special kind of interface, called a graphical-user-interface-function, or "GUI function". GUI-functions specify lists of input parameters, like any other interface. They also specify a format string, to which input parameters will be embedded in order to form the activation key sequence, and a window name, to which the activation key sequence should be send in order to activate the desired function.

Figure 23:
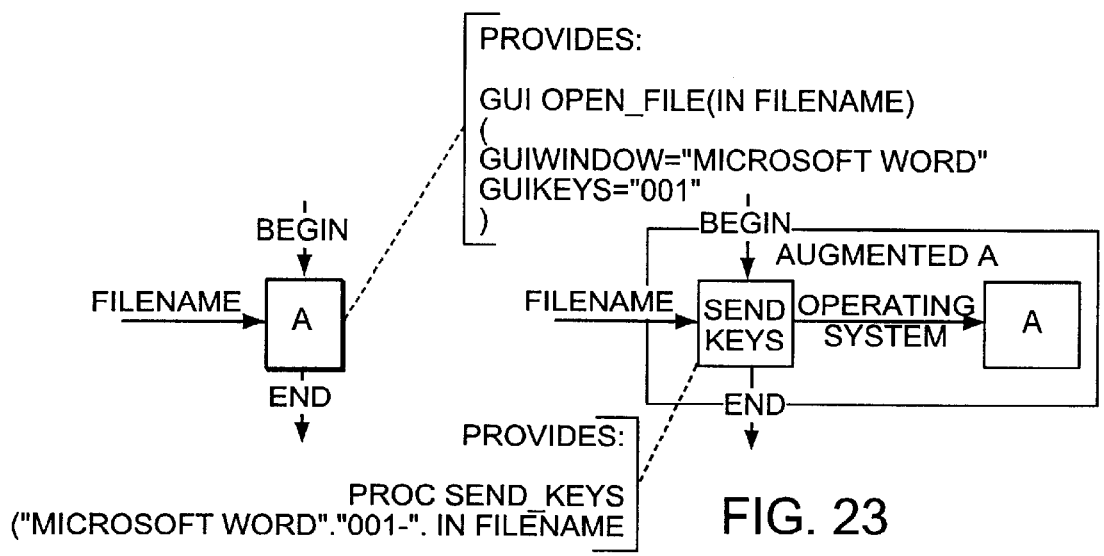
FIG. 23 illustrates the introduction of a graphical user interface function and caller in an activity.

Caller activities for GUI functions are source code procedures which receive the target window name, the format string, and all input parameters, and use operating system calls in order to send the activation key sequence to the target window, as shown in FIG. 23.

There is one special case where the explicit introduction of caller and wrapper activities might lead to inefficiencies, or even errors. That is when two of more components with perfectly matching composite interfaces are connected to each other. In such cases, the composite pattern of dependencies that specifies the connections among those interface elements is automatically managed. In order to complete the support for this step, design assistants should first check for this special case.

Once generic design elements are specialized and interface dependencies are decoupled, executable code may be generated. As can now be seen, the "raw material" of this component-based application development process is a set of code-level software components, in source or executable form. The end product is also a set of code-level components, including the original components plus some additional modules containing the coordination software that manages interdependencies among the original components. The distinction between activities and dependencies leads to a very useful intermediate representation, which facilitates the design of the coordination software. Eventually, however, the original components plus the new activities and dependencies introduced by the process of design, are integrated into sets of source or executable modules. This transformation step will be described generally, and in more detail below. This transformation step can be completely automated.

When all elements of the diagram have been replaced by an executable specialization, executable activities have direct associations with code-level software components, such as source or executable code modules. Executable dependencies are associated with built-in language and operating system interconnection processes. For example, they may include sequentialization processes for managing prerequisite dependencies, which have coordination mechanisms that specify that the activities at their endpoints will be packaged inside the same sequential code block and that the precedent activities will always be placed before the consequent activities inside that code block.

An executable dependency may include local variable transfer processes for managing data flow dependencies. Local variable coordination mechanisms have the same semantics as sequentialization processes. In addition, they specify that a data item is being transferred from the precedents to the consequents through some automatically named local variable.

Other built-in language or operating system interconnection mechanisms, such as remote procedure calls, etc., also may be included. These processes are automatically provided by the infrastructure of the target configuration and do not translate into tangible coordination code. Therefore, these primitive coordination processes need not be addressed by this transformation.

Sequentialization processes and local variable coordination processes divide a graph representing the application into a set of partially ordered subgraphs of activities. Each subgraph contains activities to be packaged into the same sequential code module. In order to generate an executable system from this graph, the graph is translated into a set of modules in one or more programming languages. The translation process has two steps, namely connecting all sequential modules to control and generating executable code.

All sequential modules are connected to control because, in order to begin execution, every software module must receive control from somewhere. This is an application-independent requirement, analogous to the requirement that, in addition to their configuration-specific interconnections, all electronic components of a computer system must also be plugged into the power network.

The application diagrams specify application-specific constraints among activities, expressed by flow and timing dependencies, in a more or less declarative fashion. Activity control ports are connected to dependencies only if the execution of those activities depends on other activities. To avoid the cluttering of diagrams with unnecessary connectors, the system enables designers to leave unconnected control ports of activities that do not depend on any other activities. The default semantics for such unconnected control ports are that the respective activities should be started as early as possible during an application run. For example, in the File Viewer example application shown in FIG. 4, the Begin ports of activities Select File, Open DB and Start Viewer are left unconnected, and in fact are not displayed. This lack of connection implies that execution of those activities does not depend on any other activity, and should start immediately upon initiation of the application.

By allowing the existence of unconnected control ports, even after all dependencies have been managed some of the original and newly introduced modules might not be connected to a source of control. By default, these modules should start immediately upon initiation of the application. Therefore, before code can be generated, those modules have to be identified and connected by control flow dependencies to a source of control. Furthermore, in order to make the invocation of the application as simple as possible, all application modules are connected by control flows to a single application entry point, which is typically a user-selectable executable file.

One possible packaging strategy that achieves those goals is the following. First, the application graph is scanned to locate all source modules that are not connected to a source of control. A set of packaging executable components can be introduced, one per host machine and per language for which unconnected source modules exist. Calls to unconnected source modules are packaged inside the main program of the packaging executable corresponding to the host machine and language of each module. These steps introduce additional executable modules into the system. These executable modules must, in turn, be connected to a source of control, so that they can begin execution when the application starts. Accordingly, all executable programs that are not connected to a source of control are then located. An application entry executable component is then introduced into the system. This last component is the entry point to the entire application, and can be written in an operating system script language, or in any other programming language. Invocation statements for all unconnected executables can then be packaged inside the main program of the application entry executable.

Figure 24:
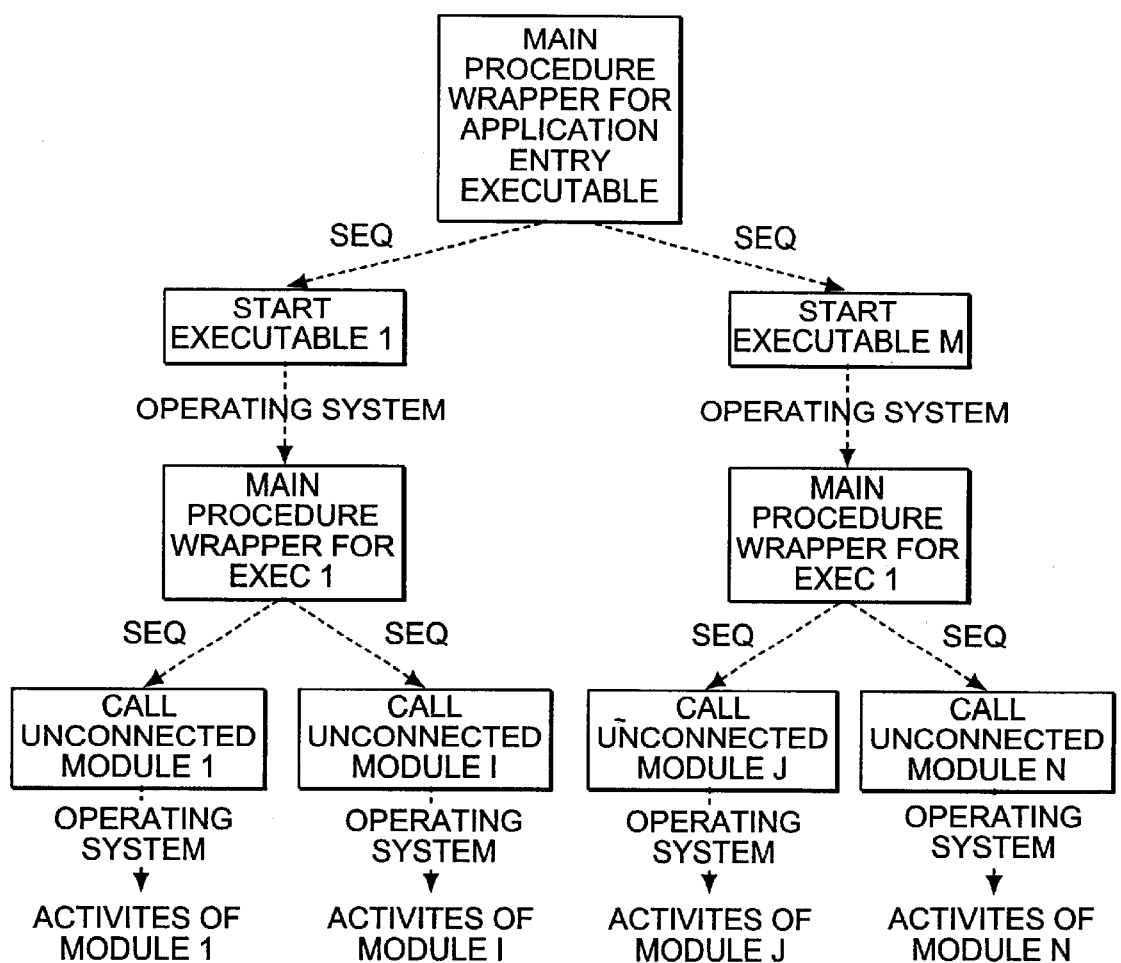
FIG. 24 illustrates additional activities that are introduced by a packaging algorithm.

This process of adding sources of control to the application introduces a set of additional activities and coordination processes into the application graph, as shown in FIG. 24. However, this process assumes that all languages used in the application permit the structuring of programs as application-executables-procedures hierarchies. Since this model is not true for all languages, the packaging strategy should be easily modifiable. At best, it should be a selectable parameter of the design process.

After this packaging has been completed, the architectural description graphs can be translated to sets of modules by a relatively straightforward process. Primitive coordination processes divide the graphs into families of partially ordered subgraphs, each corresponding to a sequential code block. Nodes in these subgraphs correspond to source code activities, that is, activities that are associated with source code procedures. Arcs in the graphs correspond to sequentialization processes and local variable primitive coordination processes that impose ordering constraints and data transfers through local variables.

The code generation process creates a topological sort of each subgraph, also handling the possibility of loops and branches, generates a procedure call statement for each activity in the subgraph, generates and automatically names local variables that transfer data among procedure call statements in the same subgraph, and packages all statements and variable definitions into sequential code blocks for the given language.

In order for the code generator to generate the correct syntax for each source language, the code generator has some language-specific knowledge for each language it handles. However, this language-specific knowledge may be quite limited, and can include syntactic rules for generating procedure calls, declaring local variables, and generating procedure headers and footers. Support for a new language can thus easily be concentrated into a single class definition. Providing support for a new language will be described in more detail below.

A more detailed description of the process of code generation will now be provided in connection with the flowcharts and pseudocode of FIGS. 25–30. FIG. 25 illustrates the general process of generation of an application performed by a code generator. It receives as its input a representation of the application in accordance with the architectural description language described above. This process involves decoupling any interface dependencies as indicated in step 330, then specializing generic design elements as indicated at 332. All modules are then connected to a source of control as indicated in step 334. Finally, executable code is generated in step 336. The set of executable files so generated are the output.

The process of decoupling interface dependencies will now be described in connection with FIG. 26. Interface dependencies are decoupled by first recursively scanning all activities in the software architecture definition, such as may be found in a graph representing the system, such as in FIG. 4, as indicated by step 338. For every activity associated with a code level component, all provided and expected interface definitions of the associated components are scanned in step 340. For every provided interface, the interface kind is retrieved in step 342. If a caller activity has been defined for that interface kind, a check for a "perfect match" special case is performed in step 344. If no perfect match interface is found at the other end, the original primitive activity is replaced with a composite pattern which includes a caller activity in step 346. For every expected interface, the interface kind is obtained in step 348. If a wrapper activity has been defined for that interface, a check for a "perfect match" special case is performed in step 350. If no perfect match interface is found at the other end, the original primitive activity is replaced with a composite pattern that contains a wrapper activity in step 352.

Figure 27:
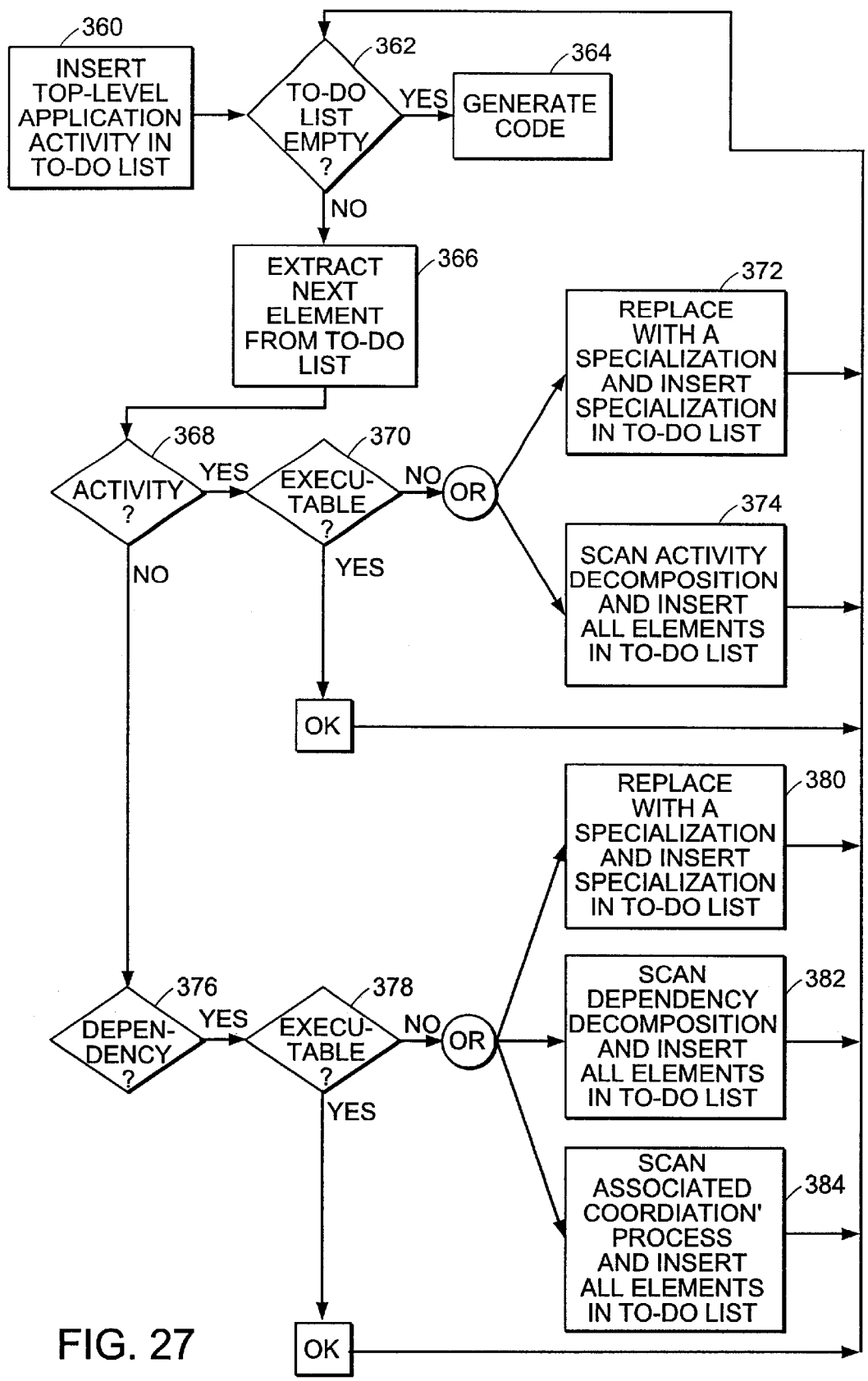
FIG. 27 is a flow chart describing how generic design elements are specialized.

Referring now to FIG. 27, the process of iteratively specializing generic elements in an architecture description will now be described. This process may be fully automated by allowing designers to specify evaluation functions, or constraints that enable the computer to automatically rank candidate alternatives for each transformation. Such evaluation functions could be constraints on specific process attributes for functions related to the computational cost of the coordination process. This process uses a to-do list which contains all generic atomic activities, i.e., atomic activities not associated with a code level components, and all unmanaged dependencies. The top level application activity is inserted in the to-do list in step 360. If the to-do list is empty, as determined in step 362, code is then generated in step 364, in a manner to be described below. Otherwise, the next element is extracted from the to-do list in step 366. If this element is an activity as determined in step 368, and if it is executable, as determined in step 370, processing returns to step 362. If the activity is not executable, then it is either replaced with a specialization, and the specialization is inserted in the to-do list in step 372, or the activity decomposition is scanned in step 374 and all of its elements are inserted in the to-do list. The processing then returns to step 362. If the element extracted from the to-do list is a dependency, as determined in step 376, and if it is executable, as determined in step 378, processing returns to step 362. If the dependency element is not an executable element, then it is either replaced with a specialization, and the specialization is inserted in the to-do list in step 380, or its dependency decomposition is scanned in step 382, and all elements in the decomposition are inserted in the to-do list, or the associated coordination process is scanned in step 384 and the elements of the coordination process are inserted in the to-do list.

This specialization process will now be described in more detail in connection with FIG. 28. The first step of the specialization of elements of a design is step 390 of scanning the present high-level application definition to build the to-do list of all generic atomic activities and unmanaged dependencies. Until the to-do list is empty, activities and unmanaged dependencies are extracted respectively in steps 392 and 394. For extracted generic atomic activities and for each executable specialization of that activity stored in the design repository, the compatibility checking algorithm in FIG. 17 is applied in step 396. If two (or more) matching executable specializations are found, the user is asked to select between them in step 398 unless information is available to permit automatic selection. If one matching executable specialization is found it is automatically selected. Otherwise, a user is asked to provide a specialization for the activity and the validity of the user supplied activity is checked in step 400. The user supplied activity is valid if it passes the compatibility checking algorithm of FIG. 17 and if it is either atomic and executable or composite. The new activity is then stored in the process repository in step 402. The generic activity is then replaced with the selected or user supplied specialization in step 404. Interface dependencies are then decoupled in step 406 by applying the algorithm of FIG. 26. If the replacing activity is composite and generic, the activity decomposition is scanned and all generic atomic activities and unmanaged dependencies in the activity decomposition are added to the to-do list in step 408.

For each unmanaged dependency, for each coordination process associated with a specialization of the dependency and stored in the design repository, the compatibility checking algorithm is applied in step 410. If two (or more) matching coordination processes are found, the user is asked to select between them in step 412 unless information is available to permit automatic selection. If one matching coordination process is found, it is simply selected. If no matching coordination process is found, a user is asked to provide a compatible coordination process in step 414. This process is used if valid. Validity is checked in step 416 by applying the compatibility checking algorithm of FIG. 17 and if the user supplied process is either atomic and executable or composite. The new process is stored in the process repository in step 418. The dependency is then managed with the selected or user supplied coordination process in step 420. Interface dependencies are then decoupled in step 422 by applying the algorithmm of FIG. 26. If the managing coordination process is composite, its process decomposition is scanned and all generic atomic activities and unmanaged dependencies are added to the to-do list in step 424.

Referring now to FIG. 29, all of the source modules defined by the specialization process are identified in step 430. A set of packaging executable components are introduced in step 432 for each host machine and language for which unconnected source modules exist. Next, calls to unconnected source modules are packaged inside the main program of the packaging executable corresponding to the host machine and language of each unconnected source module in step 434. Next, all executable programs that are not connected to a source control are identified in step 436. An application entry executable component is then introduced into the system in step 438. Invocation statements for all unconnected executables are then packaged inside the main program of the application entry component in step 440.

The generation of executable code will now be described in connection with FIG. 30. The specialized architectural definition is scanned and divided into sequential block subgraphs in step 442. For each subgraph, the following steps are performed. First, activities are topologically ordered according to their sequentialization interdependencies in step 444. A call statement is then generated for each activity in step 446. A local variable declaration is generated for each local variable coordination process in step 448. Appropriate headers and footers for the enclosing sequential block are then generated in step 450. The resulting sequential block code is stored in a file in step 452. For each target executable, all source and object files of the executable are collected in step 454. These files are compiled and the resulting executable is placed into a target application directory in step 456.

Example applications generated by this procedure are illustrated in U.S. provision patent application serial no. 60/013,694, filed Mar. 19, 1996, which is hereby incorporated by reference.

This architectural description language also may be used to automatically configure enterprise-wide software applications packages, which are integrated software packages which attempt to support all the different business functions of an enterprise. The idea is that a company can purchase such a package, customize it to a certain extent in order to match its particular requirements, and install it instead of building its own software from scratch. Such packages are available from, for example, SAP, Oracle, Peoplesoft, and Baan. Most enterprise-wide software packages contain a number of configuration tables that can be modified in order to customize their operation.

A company interested in installing one of those packages typically starts by examining the current state of its business processes. It then needs to compare its processes with the set of alternative processes supported by the package. In most cases, the company would have to select the supported process that comes closest to its requirements and then change its current process to match the supported process. The package also may have to be customized to support the specific process variation that was selected.

The configuration of such enterprise-wide software applications can be facilitated, and in some cases completely automated, by associating configuration table information to every different process element that can be supported by the software package. All different process 54 variants supported by the software package can be stored and organized in a specialization hierarchy using the present invention. When users select one particular set of process variants that most closely correspond to the way their organization works, the resulting process model can be processed to generate the software package configuration tables.

In particular, in order to generate the configuration tables, the decomposition graph of the final process model is traversed. Each node in the graph is an elementary process supported by the software package. Associated with each elementary process are a number of configuration parameters stored in the form of attributes. As the graph is traversed, the configuration parameters found in the different nodes are collected and separated into groups corresponding to each configuration table. When the traversal is complete, the system simply builds the configuration tables based on the parameters it has collected.

Two situations might arise which complicate this process. First, two or more process steps selected in the final process model might specify conflicting values for one or more configuration parameters. In such cases, the user is notified, the conflicting process steps are identified and compatible alternatives may be presented. These alternatives may be identified by searching the specialization hierarchy for each conflicting process step in parallel, by examining their neighboring specializations, cousins, etc., and by identifying sets of process steps that both are compatible specializations of their corresponding conflicting process step and result in configuration parameter settings that do not conflict. This search step is very similar to the search of the coordination process space, performed by the design assistant in order to locate compatible coordination processes for a given dependency. If several compatible alternatives are located, the user makes the final selection.

Second, even after all process steps have been traversed, some essential configuration parameters might remain undefined. In those cases, a high-level description of the missing parameters may be presented to the user. Assistance may be provided through various help sequences to guide the user into providing values for these parameters.

Apart from facilitating the development of software applications by combining existing software components, this language and its associated tools have the potential to assist the development of new applications from scratch. In such an application, an editor 42 (see FIG. 3) can be used to sketch a decomposition of a system into generic activities, which then can be specialized and refined as more insight about the system is obtained. The design assistant 48 can store alternative domain-specific architectures in one or more repositories that can further assist designers both in specifying and in refining the functional decomposition of a system.

Once designers have finalized the decomposition of an application into patterns of activities and dependencies, atomic activities are manually implemented. If the decomposition is sufficiently detailed, atomic activities are defined at a granularity fine enough to allow for a straightforward implementation. The design assistant 48 can assist the selection of coordination processes for managing dependencies through the process described above. When this step is complete, the code and/or configuration generator 44 can automatically generate coordination code, package components into procedures and executables, and produce a final executable system.

The development of systems using this approach has the following advantages. First, in initial application development, designers are able to select components to implement activities independently of one another. Potential mismatches generally are handled by coordination processes. Also, dependencies are managed routinely by coordination processes based on systematic design frameworks. Additionally, a process repository 30, used as a handbook, suggests alternative ways of implementing activities and dependencies.

Second, during application maintenance, designers often need to change the implementation of activities, in order to reflect changes in functional requirements. Applications can be reconstructed easily after such changes by reusing the same architectural diagram and simply managing the dependencies of the affected activities with the rest of the system. Additionally, when applications are ported to a new environment, their abstract architecture (activities and dependencies) remains unaffected. However, the use of different coordination processes might be required. By making dependency management routine, the new environment may be managed readily and a new application may be constructed quickly from the original architectural description and functional components.

There are several modifications that may be made to the architectural description language, and associated tools and repositories, from the particular exemplary embodiment shown above.

For example, all activities and dependencies currently have a statically fixed number of ports. In other words, each activity knows at design time how many and which other activities it might interact with. In many real systems, interaction patterns are determined dynamically during runtime and might vary during the lifetime of an execution. To be able to model such systems, the architectural description language may be extended with activity and dependency constructs that represent sets of indefinite run-time determined cardinality.

The architectural description language described above also uses attribute definitions for expressing architectural assumptions. Although attribute definitions seem to be powerful enough to express a number of relationships and constraints, systematic guidelines on how and when to use them may be provided by classifing and standardizing architectural assumptions the way these assumptions are expressed.

Although the vocabulary of dependencies described above in connection with the repository of coordination processes is capable of describing a large number of commonly occurring relationships, it is merely illustrative and is neither limiting nor complete. As non-trivial software applications are developed and implemented, additional relationships may be encoded as special cases of existing dependency types, or as new dependency types. Likewise, the design space of coordination processes can be enriched by new generic processes, or by new special cases of existing generic processes.

In particular, commonly occurring composite patterns of dependencies, for which efficient joint coordination processes have been developed, could be represented. One example is the joint management of a set of unidirectional flows through the network by combining the respective data items into a single packet. The existence of a library of such composite entities will enable automated design assistants to scan application architectural descriptions, discover patterns of simpler dependencies that correspond to composite dependencies, and efficiently manage them using joint coordination processes.

Design rules can also be added to automate the selection of a particular coordination process from among multiple compatible coordination processes for a given dependency. Such design rules may help automate this selection step, for example, by ranking candidate processes according to various evaluation criteria such as their response time, their reliability, and their overall fit with the rest of the application. For example, when managing a data flow dependency, one possible design heuristic would be to use direct transfer of control, e.g., remote procedure calls, when the size of the data that flows is small, and to use a separate carrier resource, such as a file, when the size of the data is large.

The present invention may also be used to provide applications in varying architectural styles, such as client-server, pipe-filter, and event-based architectures. In particular, by selecting different coordination processes of a particular architectural style, the same set of components can be organized into applications conforming to different architectural styles. In addition, the multidimensional design space of coordination processes discussed above can thus provide a useful vehicle both for defining styles as combinations of design choices, and for providing more specific guidelines as to which design choices are consistent with a desired architectural style. For example, event-based architectures exclude the management of dependencies using push or pull organizations. Furthermore, our design space could help invent and characterize new architectural styles.

Other improvements may be made to improve performance of this system. For example, before managing a dependency, an exhaustive search of candidate coordination processes is performed applying the compatibility checking algorithm of FIG. 17 to each candidate. For large repositories of coordination processes, this approach could be prohibitively slow. Appropriate heuristics can be developed to eliminate some of the potential candidates without the need to apply the compatibility checking algorithm. Such heuristics may rely on specifications of performance requirements, or on constraints on the desired architectural style of the overall system.

While emphasis above was placed on having a handbook of coordination processes, this system is also particularly well-suited for building repositories of generic and specialized architectures in a wide variety of domains. Such repositories of domain-specific architectures or software architecture handbooks, could serve as useful starting points for designing any new system. For example, when starting the design of a new application, designers first consult the handbook, in order to retrieve alternative generic architectures of similar systems. They can then specialize those generic architectures to fit their particular needs.

The properties of this architectural description language also suggest structures for new programming languages that separate the core function of software components from their application-specific interconnection protocols. Such programming languages should define components which interact with their environment through input and output resource ports only. In addition every input and output port of a component should be independently managed. That is, every input resource expected by a component should be independently produced and made accessible to the component. Likewise, every output resource should be independently made accessible to its consumers. Every input port should be connected to an arbitrary number of producers and every output port an arbitrary number of consumers. Finally, components should make no assumptions about exclusive or shared ownership of resources. If necessary, coordination support for sharing resources should be defined completely outside the component. A conventional programming language construct that more closely satisfies these properties is a sequential block of code which receives all its inputs and leaves all its outputs to independent local variables. An appropriate progranming language should offer explicit support for abstractions with such properties.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A computer system for automatically generating computer code for a software system from a representation of the software system, comprising:
    means for specializing each activity and dependency in the representation to identify one or more associated computer programs for implementing the activity or managing the dependency, wherein the representation is defined by activities, dependencies and ports through which activities are connected to dependencies; and
    means for combining the associated computer programs in the specialized representation to provide the computer code for the software system.

2. The computer system of claim 1, further comprising computer system includes means for editing representations of software systems and means for storing the representations of the software systems on a computer-readable medium.

3. The computer system of claim 2, wherein the means for editing representations of software systems includes:
    means for generating a representation of an activity including an indication of ports defining needs for interaction with other activities through dependencies;
    means for generating a representation of a dependency including an indication of ports defining points of connection with activities; and
    means for controlling connections of activities to dependencies and for performing a compatibility check of the ports of the connected activities and dependencies.

4. The computer system of claim 1, further comprising means for editing the representations of software systems, including:
    means for generating a representation of an activity including an indication of ports defining needs for interaction with other activities through dependencies;
    means for generating a representation of a dependency including an indication of ports defining points of connection with activities; and
    means for controlling connections of activities to dependencies and for performing a compatibility check of the ports of the connected activities and dependencies.

5. The computer system of claim 4, further comprising a browser for viewing the representation of a software system.

6. The computer system of claim 4, further comprising:
    means for generating a representation of a resource which provides outputs of activities that are beyond the scope of the software system represented.

7. The computer system of claim 4, wherein the means for generating a representation of an activity includes means for defining the activity as a specialization of another activity.

8. The computer system of claim 4, wherein the means for generating a representation of an activity includes means for defining a decomposition of the activity as a set of activities interconnected by dependencies.

9. The computer system of claim 4, wherein the means for defining a dependency includes means for defining the dependency as a composite dependency.

10. The computer system of claim 4, wherein the means for defining a dependency includes means for defining the dependency as a specialization of another dependency.

11. A computer-implemented process for generating executable code from a system description including activities connected to dependencies, wherein each activity has ports connected ports of dependency, wherein the process comprises the steps of:
    augmenting each activity with appropriate wrappers and callers so that each dependency connected to a port of an augmented activity can be managed independently of any other dependency of the same activity;
    associating each activity with executable software programs by searching a database for compatible specializations of the activity;
    selecting one of the compatible specializations;
    replacing the target activity with the selected compatible specialization;
    associating each dependency with a coordination process to manage the dependency by searching the database for compatible coordination processes for the dependency;
    selecting one of the compatible coordination processes;
    replacing the target dependency with the selected compatible coordination process; with the selected compatible coordination process;
    recursively applying the steps of associating and replacing for decomposition of each selected specialization of an activity for which there is no compatible executable software program; and
    when all activities and dependencies of the application model have been replaced with executable specializations, generating executable code by traversing the application model and combining the pieces of software associated with each element of the model into sets of procedures, and by compiled the sets of procedures into executable programs.

12. The process of claim 11, wherein the step of selecting one of the compatible specializations includes the steps of:
presenting possible selections to a user; and
receiving an input from a user indicative of the selected compatible specialization.

13. The process of claim 11, wherein the step of selecting a compatible specialization includes a selection based on function of attributes of the compatible specializations.

14. The process of claim 11, wherein the step of selecting one of the compatible coordination process includes the steps of:
presenting possible selections to a user; and
receiving an input from a user indicative of the selected compatible coordination process.

15. The process of claim 11, wherein the step of selecting a compatible includes a selection based on function of attributes of the compatible coordination processes.

16. A computer system for automatically generating computer code for a software system from a representation of the software system, wherein the representation is defined by activities, dependencies and ports through which activities are connected to dependencies, comprising:
means for specializing each activity and dependency in the representation to identify one or more associated computer programs for implementing the activity or managing the dependency;
means for combining the associated computer programs in the specialized representation to provide the computer code for the software system;
means for editing the representations of software systems, including:
means for generating a representation of an activity including an indication of ports defining needs for interaction with other activities through dependencies;
means for generating a representation of a dependency including an indication of ports defining points of connection with activities; and
means for controlling connections of activities to dependencies and for performing a compatibility check of the ports of the connected activities and dependencies; and
means for defining a coordination process associated with a dependency and having ports connecting to ports of activities, wherein the coordination process includes at least one activity and associated dependencies, wherein the ports of the coordination process are ports of the dependencies.

17. A computer system for automatically generating computer code for a software system from a representation of the software system, wherein the representation is defined by activities, dependencies and ports through which activities are connected to dependencies, comprising:
means for specializing each activity and dependency in the representation to identify one or more associated computer programs for implementing the activity or managing the dependency;
means for combining the associated computer programs in the specialized representation to provide the computer code for the software system;
wherein a coordination process manages a dependency and further comprising means for storing representations of coordination processes for software systems, including:
a computer-readable medium;
a plurality of computer-readable representations of coordination processes, including associated computer program code for each representation for implementing the coordination process wherein a representation of a coordination process includes activities connected through dependencies and having ports corresponding to ports of dependencies and defining points of connection with activities; and
means for associating the representation of coordination processes with one or more of a plurality of dependency types.

18. The computer system of claim 17, wherein the dependency types include at least one of flow dependencies, resource sharing dependencies and timing dependencies.

19. The computer system of claim 17, further comprising a browser for viewing the representations of the coordination processes and for viewing specialization of a process for managing one of the dependency types.

20. The computer system of claim 17, wherein the means for specializing selects an associated computer program from the computer-readable medium when the specialized dependency has a coordination process with corresponding computer code stored therein.

21. A computer system for automatically generating computer code for a software system from a representation of the software system, wherein the representation is defined by activities, dependencies and ports through which activities are connected to dependencies, comprising:
means for specializing each activity and dependency in the representation to identify one or more associated computer programs for implementing the activity or managing the dependency;
means for combining the associated computer programs in the specialized representation to provide the computer code for the software system; and
means for determining whether ports of an activity are compatible with ports of a dependency, comprising:
means for determining whether the ports of the activity and the dependency are both composite or both atomic;
means, if both ports are atomic, for determining if each attribute of the port of the activity has a value which is the same as or a specialization of the value of the same attribute at the port of the dependency; and
means, if both ports are composite, for recursively matching subports of the composite ports.

22. The process of claim 21, further comprising the step of:
if both ports are atomic and at least one of the ports has an attribute set to a variable, then determining if the variable can be unified successfuly with a value of the same attribute at the other port.

* * * * *